(12) United States Patent
Douros et al.

(10) Patent No.: US 10,601,890 B2
(45) Date of Patent: Mar. 24, 2020

(54) RECOVERABLE STREAM PROCESSING

(71) Applicant: Ab Initio Technology LLC, Lexington, MA (US)

(72) Inventors: Bryan Phil Douros, Framingham, MA (US); Craig W. Stanfill, Lincoln, MA (US); Joseph Skeffington Wholey, III, Belmont, MA (US)

(73) Assignee: Ab Initio Technology LLC, Lexington, MA (US)

( * ) Notice: Subject to any disclaimer, the term of this patent is extended or adjusted under 35 U.S.C. 154(b) by 346 days.

(21) Appl. No.: 15/405,618

(22) Filed: Jan. 13, 2017

(65) Prior Publication Data

US 2017/0208113 A1    Jul. 20, 2017

Related U.S. Application Data

(60) Provisional application No. 62/278,528, filed on Jan. 14, 2016.

(51) Int. Cl.
*H04L 29/06* (2006.01)
*G06F 11/14* (2006.01)
(Continued)

(52) U.S. Cl.
CPC ............. *H04L 65/607* (2013.01); *G06F 9/52* (2013.01); *G06F 11/1438* (2013.01); *H04L 67/1097* (2013.01); *H04L 67/42* (2013.01); *G06F 11/1446* (2013.01); *G06F 11/2094* (2013.01); *G06F 11/2097* (2013.01); *G06F 2201/84* (2013.01)

(58) Field of Classification Search
CPC ...... G06F 16/245; G06F 16/248; G06F 11/14; G06F 11/1402; G06F 11/1471
See application file for complete search history.

(56) References Cited

U.S. PATENT DOCUMENTS 5,712,971 A    1/1998    Stanfill et al.
5,857,204 A    1/1999    Lordi et al.
(Continued)

FOREIGN PATENT DOCUMENTS

JP    2009-080705    4/2009
JP    2009080705    4/2019
KR    10-2014-0004702    1/2014

*Primary Examiner* — Chirag R Patel
(74) *Attorney, Agent, or Firm* — Occhiuti & Rohlicek LLP

(57) ABSTRACT

A computing system includes nodes executing data processing programs that each process at least one stream of data units. A data storage system stores shared data accessible by at least two of the programs. Processing at least one stream using a first data processing program includes: processing a first stream of data units that includes multiple subsets of contiguous data units; initiating termination of processing within the first data processing program, between processing a first subset of contiguous data units and processing a second subset of contiguous data units adjacent to the first subset of contiguous data units within the first stream of data units; durably storing at least some changes to the shared data caused by processing the first subset of contiguous data units after determining that the termination of processing within the first data processing program has completed; and resuming processing within the first data processing program.

62 Claims, 16 Drawing Sheets

(51) Int. Cl.
*G06F 9/52* (2006.01)
*H04L 29/08* (2006.01)
*G06F 11/20* (2006.01)

(56) References Cited

U.S. PATENT DOCUMENTS

| | | | |
|---|---|---|---|
| 6,154,847 A * | 11/2000 | Schofield | G06F 11/1471 |
| | | | 714/20 |
| 6,584,581 B1 | 6/2003 | Bay et al. | |
| 6,654,907 B2 * | 11/2003 | Stanfill | G06F 11/1458 |
| | | | 712/221 |
| 7,769,717 B2 * | 8/2010 | Federwisch | G06F 11/1451 |
| | | | 707/649 |
| 9,298,788 B1 * | 3/2016 | Kekre | G06F 11/1402 |
| 9,354,981 B2 | 5/2016 | Wholey, III | |
| 9,678,834 B2 | 6/2017 | Stanfill | |
| 2008/0253283 A1 | 10/2008 | Douglis et al. | |
| 2008/0307258 A1 | 12/2008 | Challenger et al. | |
| 2010/0293532 A1 | 11/2010 | Andrade et al. | |
| 2013/0305087 A1 * | 11/2013 | Catthoor | G06F 11/14 |
| | | | 714/15 |
| 2014/0089352 A1 | 3/2014 | Branson et al. | |
| 2015/0212891 A1 | 7/2015 | Douros et al. | |
| 2016/0006779 A1 | 1/2016 | Zhou et al. | |

* cited by examiner

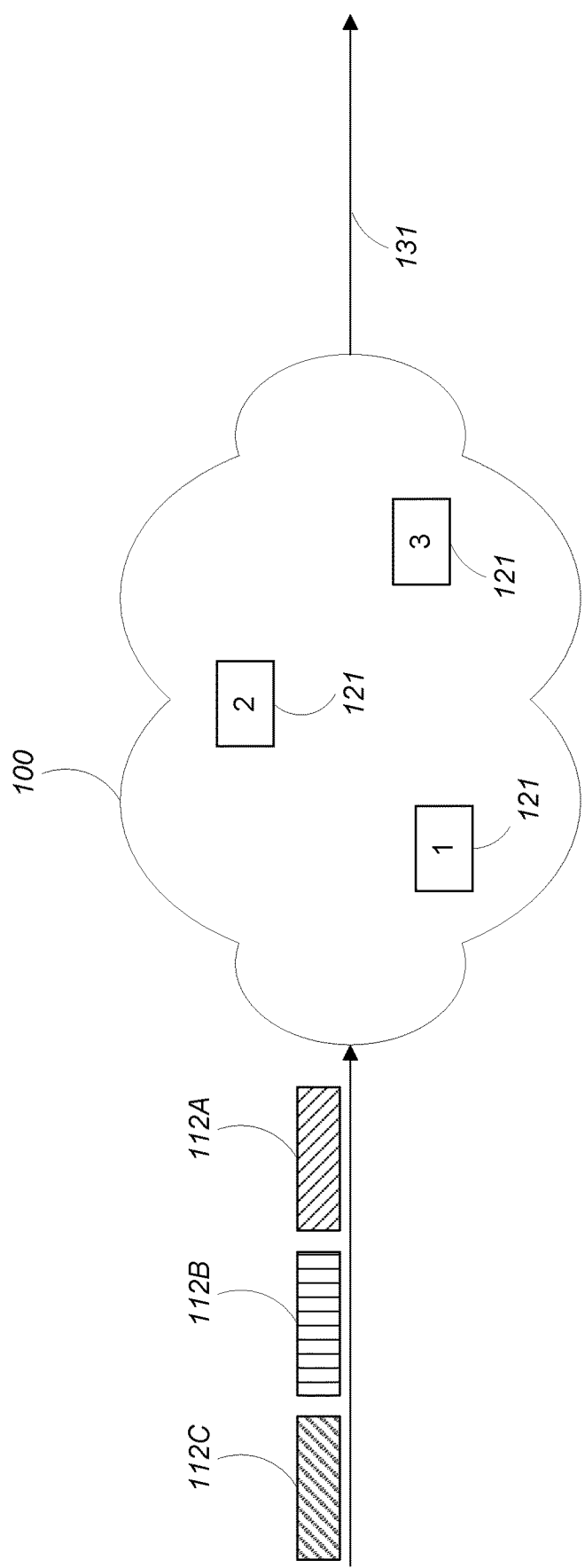

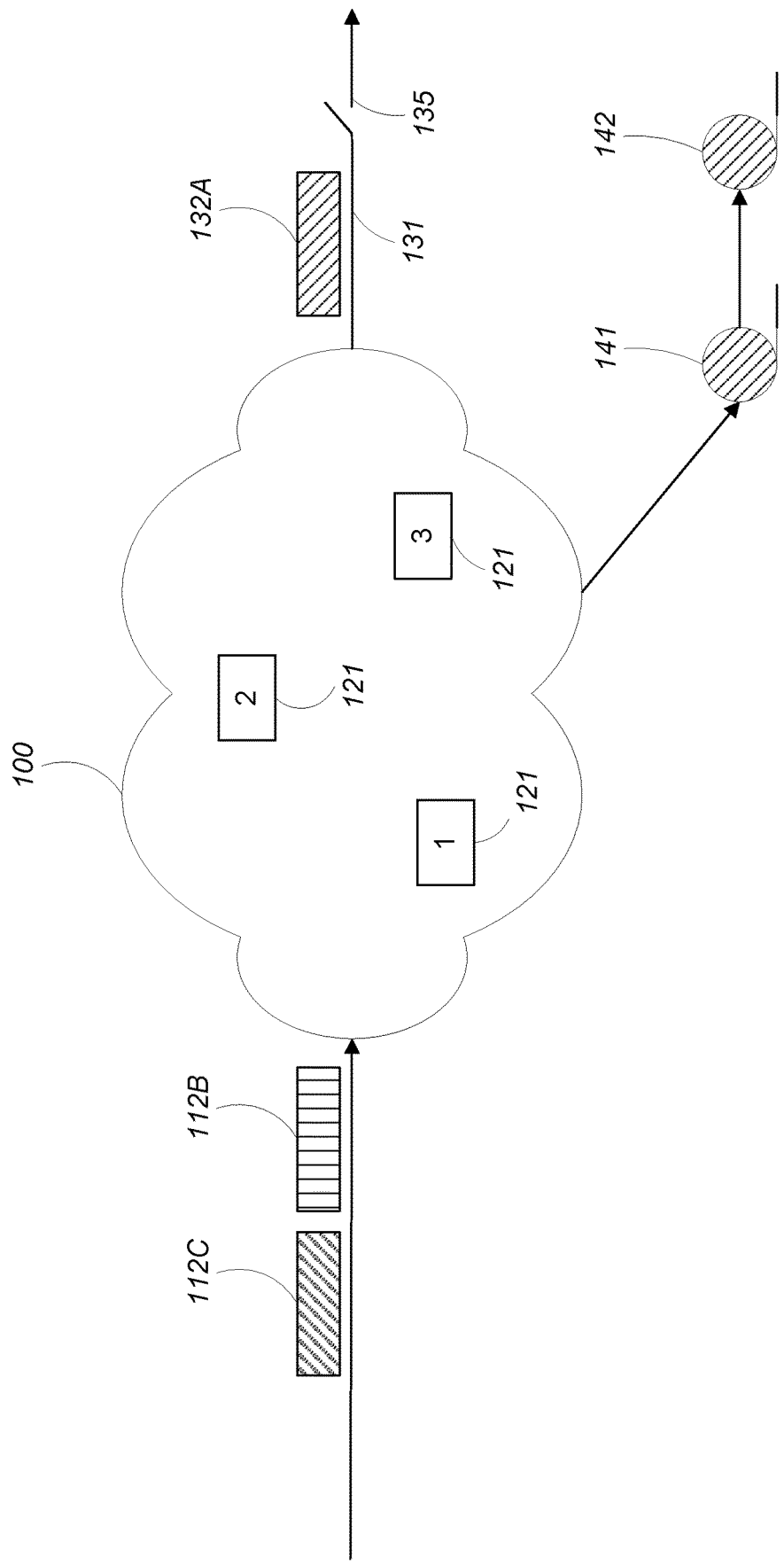

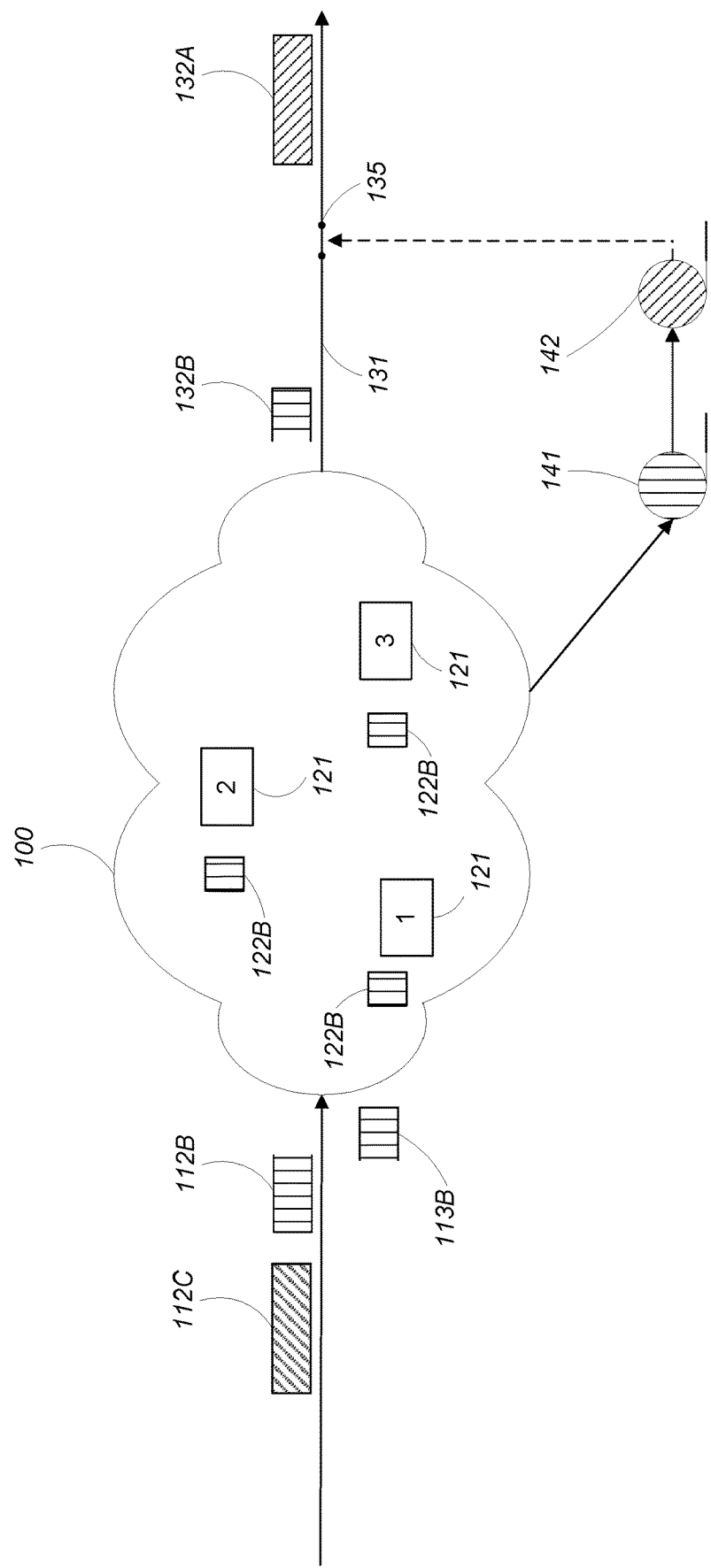

RECOVERABLE STREAM PROCESSING

CROSS-REFERENCE TO RELATED APPLICATIONS

This application claims priority to U.S. Application Ser. No. 62/278,528, filed on Jan. 14, 2016, incorporated herein by reference.

BACKGROUND

This description relates to recoverable stream processing.

Some data processing programs receive a batch of data to be processed (e.g., one or more files or database tables), and the amount of time needed for processing that data is well-defined since it is based on the amount of data in the batch. This type of processing is called "batch processing." Some data processing programs receive one or more streams of data that are processed for a potentially unknown amount of time since the streams may include an unknown or arbitrary number of data units, or a potentially continuous flow of data units. This type of processing is called "stream processing" or "continuous flow processing." The factors that are relevant to providing recoverability in data processing systems can depend on the type of processing being used, as well as other characteristics such as whether or not there are multiple interacting data processing programs, and whether or not the order of processing data units is deterministic.

SUMMARY

In one aspect, in general, an apparatus includes: a computing system including one or more nodes, the computing system configured to execute a plurality of data processing programs that each process at least one stream of data units; and at least one data storage system accessible to at least one of the one or more nodes, the data storage system, in use, storing shared data accessible by at least two of the plurality of data processing programs. Processing at least one stream of data units using at least a first data processing program of the one or more data processing programs includes: processing a first stream of data units to generate output for each of a plurality of subsets of contiguous data units within the first stream of data units; initiating termination of processing within the first data processing program, between processing a first subset of contiguous data units and processing a second subset of contiguous data units adjacent to the first subset of contiguous data units within the first stream of data units; durably storing at least some changes to the shared data caused by processing the first subset of contiguous data units after determining that the termination of processing within the first data processing program has completed; resuming processing within the first data processing program after the changes have been durably stored; and releasing, from the first data processing program, first output generated for the first subset of contiguous data units after the changes have been durably stored.

Aspects can include one or more of the following features.

The plurality of data processing programs each process at least one stream of data units with no program state information being maintained over more than two adjacent data units in the stream.

The data storage system includes a non-volatile storage medium, and durably storing at least some changes to the shared data caused by processing the first subset of contiguous data units includes storing the changes in the non-volatile storage medium.

The data storage system includes a communication medium coupled to a plurality of the nodes, and durably storing at least some changes to the shared data caused by processing the first subset of contiguous data units includes sending the changes from a first node to at least a second node of the plurality of the nodes over the communication medium.

The data storage system also stores stream state information associated with one or more streams of data units processed by at least one of the plurality of data processing programs.

Processing at least one stream of data units using at least the first data processing program further includes, after determining that the termination of processing within the first data processing program has completed, durably storing stream state information associated with the first stream of data units.

Releasing, from the first data processing program, the first output generated for the first subset of contiguous data units includes releasing the first output to an external program that is not included in the plurality of data processing programs executing on the computing system.

Durably stored changes to the shared data caused by processing the first subset of contiguous data units are distinguished from durably stored changes to the shared data caused by processing the second subset of contiguous data units (e.g., enabling pipelined checkpoints, as described in more detail below).

At least some changes to the shared data caused by processing the first subset of contiguous data units are durably stored after at least some changes to the shared data caused by processing the second subset of contiguous data units have started, where the first subset of contiguous data units are before the second subset of contiguous data units within the first stream of data units.

The first output generated for the first subset of contiguous data units is released from the first data processing program after all changes caused by processing the first subset of contiguous data units have been durably stored.

Processing is resumed within the first data processing program after a first portion of changes have been durably stored but before a second portion of changes have been durably stored.

The first data processing program terminates processing the first stream of data units periodically, and the computing system begins durably storing at least some changes to the shared data caused by processing data units while the first data processing program is terminated.

Initiating termination of processing within the first data processing program includes inserting a stream-ending indicator between the first subset of contiguous data units the second subset of contiguous data units, and the termination of processing within the first data processing program has completed after all processes that perform tasks specified by the first data processing program have exited normally in response to the stream-ending indicator.

The shared data is accessible by all of the plurality of data processing programs.

In another aspect, in general, an apparatus includes: means for executing a plurality of data processing programs that each process at least one stream of data units; and means for storing shared data accessible by at least two of the plurality of data processing programs; wherein processing at least one stream of data units using at least a first data processing program of the one or more data processing programs includes: processing a first stream of data units to generate output for each of a plurality of subsets of contiguous data units within the first stream of data units; initiating termination of processing within the first data processing program, between processing a first subset of contiguous data units and processing a second subset of contiguous data units adjacent to the first subset of contiguous data units within the first stream of data units; durably storing at least some changes to the shared data caused by processing the first subset of contiguous data units after determining that the termination of processing within the first data processing program has completed; resuming processing within the first data processing program after the changes have been durably stored; and releasing, from the first data processing program, first output generated for the first subset of contiguous data units after the changes have been durably stored.

In another aspect, in general, a method includes: executing, on a computing system including one or more nodes, a plurality of data processing programs that each process at least one stream of data units; and storing, on at least one data storage system accessible to at least one of the one or more nodes, shared data accessible by at least two of the plurality of data processing programs; wherein processing at least one stream of data units using at least a first data processing program of the one or more data processing programs includes: processing a first stream of data units to generate output for each of a plurality of subsets of contiguous data units within the first stream of data units; initiating termination of processing within the first data processing program, between processing a first subset of contiguous data units and processing a second subset of contiguous data units adjacent to the first subset of contiguous data units within the first stream of data units; durably storing at least some changes to the shared data caused by processing the first subset of contiguous data units after determining that the termination of processing within the first data processing program has completed; resuming processing within the first data processing program after the changes have been durably stored; and releasing, from the first data processing program, first output generated for the first subset of contiguous data units after the changes have been durably stored.

In another aspect, in general, software is stored in a non-transitory form on a computer-readable medium, the software including instructions for causing a computing system to: execute a plurality of data processing programs that each process at least one stream of data units; and store shared data accessible by at least two of the plurality of data processing programs; wherein processing at least one stream of data units using at least a first data processing program of the one or more data processing programs includes: processing a first stream of data units to generate output for each of a plurality of subsets of contiguous data units within the first stream of data units; initiating termination of processing within the first data processing program, between processing a first subset of contiguous data units and processing a second subset of contiguous data units adjacent to the first subset of contiguous data units within the first stream of data units; durably storing at least some changes to the shared data caused by processing the first subset of contiguous data units after determining that the termination of processing within the first data processing program has completed; resuming processing within the first data processing program after the changes have been durably stored; and releasing, from the first data processing program, first output generated for the first subset of contiguous data units after the changes have been durably stored.

In another aspect, in general, an apparatus includes: a computing system including one or more nodes, the computing system configured to execute a plurality of data processing programs that each process at least one stream of data units; and at least one data storage system accessible to at least one of the one or more nodes, the data storage system, in use, storing shared data accessible by at least two of the plurality of data processing programs. Processing two or more streams of data units using at least a first group of multiple data processing programs of the plurality of data processing programs includes: processing, for each data processing program in the first group, a respective stream of data units that includes a plurality of subsets of contiguous data units; initiating termination of processing within each data processing program in the first group, between processing a first subset of contiguous data units and processing a second subset of contiguous data units adjacent to the first subset of contiguous data units within the respective stream of data units; durably storing at least some changes to the shared data caused by processing the first subset of contiguous data units after determining that the termination of processing within each data processing program in the first group has completed; and resuming processing within each data processing program in the first group after the changes have been durably stored.

Aspects can include one or more of the following features.

The plurality of data processing programs each process at least one stream of data units with no program state information being maintained over more than two adjacent data units in the stream.

The data storage system includes a non-volatile storage medium, and durably storing at least some changes to the shared data caused by processing the first subset of contiguous data units includes storing the changes in the non-volatile storage medium.

The data storage system includes a communication medium coupled to a plurality of the nodes, and durably storing at least some changes to the shared data caused by processing the first subset of contiguous data units includes sending the changes from a first node to at least a second node of the plurality of the nodes over the communication medium.

The data storage system also stores stream state information associated with one or more streams of data units processed by at least one of the plurality of data processing programs.

Processing two or more streams of data units using at least the first group of multiple data processing programs further includes, after determining that the termination of processing within each data processing program in the first group has completed, durably storing stream state information associated with each respective stream of data units processed by any of the data processing programs in the first group.

Processing two or more streams of data units using at least the first group of multiple data processing programs further includes releasing, from the first group of multiple data processing programs, first output generated for the first subset of contiguous data units after the changes have been durably stored.

Releasing, from the first group of multiple data processing programs, the first output generated for the first subset of contiguous data units includes releasing the first output to one of the plurality of data processing programs executing on the computing system that is not included in the first group of multiple data processing programs.

Releasing, from the first group of multiple data processing programs, the first output generated for the first subset of contiguous data units includes releasing the first output to an external program that is not included in the plurality of data processing programs executing on the computing system.

The external program sends a request to access particular shared data that is accessible by at least one data processing program in the first group, and a result of the request is released to the external program after all changes to the particular shared data that occurred before the request was received have been durably stored.

Durably stored changes to the shared data caused by processing the first subset of contiguous data units are distinguished from durably stored changes to the shared data caused by processing the second subset of contiguous data units.

At least some changes to the shared data caused by processing the first subset of contiguous data units are durably stored after at least some changes to the shared data caused by processing the second subset of contiguous data units have started, where the first subset of contiguous data units are before the second subset of contiguous data units within the first stream of data units.

The first output generated for the first subset of contiguous data units is released from the first group of multiple data processing programs after all changes caused by processing the first subset of contiguous data units have been durably stored.

Processing two or more streams of data units includes processing four or more streams of data units using at least the first group of multiple data processing programs and a second group of multiple data processing programs of the plurality of data processing programs.

Each group of multiple data processing programs terminates processing of respective streams of data units periodically, and the computing system begins durably storing at least some changes to the shared data caused by processing data units while all data processing programs in that group are terminated.

The first group of data processing programs terminates and processing of respective streams of data units at a first frequency, and the second group of data processing programs terminate processing of respective streams of data units at a second frequency different from the first frequency.

Processing is resumed within each data processing program in the first group after a first portion of changes have been durably stored but before a second portion of changes have been durably stored.

The first group of multiple data processing programs terminates processing the two or more streams of data units periodically, and the computing system begins durably storing at least some changes to the shared data caused by processing data units while all data processing programs in the first group are terminated.

Initiating termination of processing within the first data processing program includes inserting a stream-ending indicator between the first subset of contiguous data units the second subset of contiguous data units, and the termination of processing within the first data processing program has completed after all processes that perform tasks specified by the first data processing program have exited normally in response to the stream-ending indicator.

The shared data is accessible by all of the plurality of data processing programs.

In another aspect, in general, an apparatus includes: means for executing a plurality of data processing programs that each process at least one stream of data units; and means for storing shared data accessible by at least two of the plurality of data processing programs; wherein processing two or more streams of data units using at least a first group of multiple data processing programs of the plurality of data processing programs includes: processing, for each data processing program in the first group, a respective stream of data units that includes a plurality of subsets of contiguous data units; initiating termination of processing within each data processing program in the first group, between processing a first subset of contiguous data units and processing a second subset of contiguous data units adjacent to the first subset of contiguous data units within the respective stream of data units; durably storing at least some changes to the shared data caused by processing the first subset of contiguous data units after determining that the termination of processing within each data processing program in the first group has completed; and resuming processing within each data processing program in the first group after the changes have been durably stored.

In another aspect, in general, a method includes: executing, on a computing system including one or more nodes, a plurality of data processing programs that each process at least one stream of data units; and storing, on at least one data storage system accessible to at least one of the one or more nodes, shared data accessible by at least two of the plurality of data processing programs; wherein processing two or more streams of data units using at least a first group of multiple data processing programs of the plurality of data processing programs includes: processing, for each data processing program in the first group, a respective stream of data units that includes a plurality of subsets of contiguous data units; initiating termination of processing within each data processing program in the first group, between processing a first subset of contiguous data units and processing a second subset of contiguous data units adjacent to the first subset of contiguous data units within the respective stream of data units; durably storing at least some changes to the shared data caused by processing the first subset of contiguous data units after determining that the termination of processing within each data processing program in the first group has completed; and resuming processing within each data processing program in the first group after the changes have been durably stored.

In another aspect, in general, software is stored in a non-transitory form on a computer-readable medium, the software including instructions for causing a computing system to: execute a plurality of data processing programs that each process at least one stream of data units; and store shared data accessible by at least two of the plurality of data processing programs; wherein processing two or more streams of data units using at least a first group of multiple data processing programs of the plurality of data processing programs includes: processing, for each data processing program in the first group, a respective stream of data units that includes a plurality of subsets of contiguous data units; initiating termination of processing within each data processing program in the first group, between processing a first subset of contiguous data units and processing a second subset of contiguous data units adjacent to the first subset of contiguous data units within the respective stream of data units; durably storing at least some changes to the shared data caused by processing the first subset of contiguous data units after determining that the termination of processing within each data processing program in the first group has completed; and resuming processing within each data processing program in the first group after the changes have been durably stored.

In another aspect, in general, an apparatus includes: a computing system including one or more nodes, the computing system configured to execute a plurality of data processing programs that each process at least one stream of data units; and at least one data storage system accessible to at least one of the one or more nodes, the data storage system, in use, storing shared data accessible by at least two of the plurality of data processing programs. Processing at least one stream of data units using at least a first data processing program of the plurality of data processing programs includes: processing a first stream of data units that includes a plurality of subsets of contiguous data units; initiating termination of processing within the first data processing program, between processing a first subset of contiguous data units and processing a second subset of contiguous data units adjacent to the first subset of contiguous data units within the first stream of data units; durably storing at least some changes to the shared data caused by processing the first subset of contiguous data units after determining that the termination of processing within the first data processing program has completed; and resuming processing within the first data processing program before all of the changes have completed being durably stored.

Aspects can include one or more of the following features.

The plurality of data processing programs each process at least one stream of data units with no program state information being maintained over more than two adjacent data units in the stream.

The data storage system includes a non-volatile storage medium, and durably storing at least some changes to the shared data caused by processing the first subset of contiguous data units includes storing the changes in the non-volatile storage medium.

The data storage system includes a communication medium coupled to a plurality of the nodes, and durably storing at least some changes to the shared data caused by processing the first subset of contiguous data units includes sending the changes from a first node to at least a second node of the plurality of the nodes over the communication medium.

Processing at least one stream of data units using at least the first data processing program further includes storing at least one snapshot of the shared data and storing a journal of changes to the shared data caused by processing data units after the snapshot was stored.

Durably storing at least some changes to the shared data caused by processing the first subset of contiguous data units includes storing at least a portion of the snapshot and storing at least a portion of the journal of changes.

The data storage system also stores stream state information associated with one or more streams of data units processed by at least one of the plurality of data processing programs.

Processing at least one stream of data units using at least the first data processing program further includes, after determining that the termination of processing within the first data processing program has completed, durably storing stream state information associated with the first stream of data units.

Processing at least one stream of data units using at least the first data processing program further includes, before determining that the termination of processing within the first data processing program has completed, durably storing at least some changes to the shared data caused by processing the first subset of contiguous data units.

Processing at least one stream of data units using at least the first data processing program further includes, after resuming processing within the first data processing program, durably storing at least some changes to the shared data caused by processing the second subset of contiguous data units.

Durably stored changes to the shared data caused by processing the first subset of contiguous data units are distinguished from durably stored changes to the shared data caused by processing the second subset of contiguous data units.

At least some changes to the shared data caused by processing the first subset of contiguous data units are durably stored after at least some changes to the shared data caused by processing the second subset of contiguous data units have started, where the first subset of contiguous data units are before the second subset of contiguous data units within the first stream of data units.

Processing at least one stream of data units using at least the first data processing program further includes further includes generating output for each of the plurality of subsets of contiguous data units, and releasing from the first data processing program, first output generated for the first subset of contiguous data units after the changes have completed being durably stored.

The first output generated for the first subset of contiguous data units is released from the first data processing program after all changes caused by processing the first subset of contiguous data units have been durably stored.

The first data processing program terminates processing the first stream of data units periodically, and the computing system begins durably storing at least some changes to the shared data caused by processing data units while the first data processing program is terminated.

Initiating termination of processing within the first data processing program includes inserting a stream-ending indicator between the first subset of contiguous data units the second subset of contiguous data units, and the termination of processing within the first data processing program has completed after all processes that perform tasks specified by the first data processing program have exited normally in response to the stream-ending indicator.

The shared data is accessible by all of the plurality of data processing programs.

In another aspect, in general, an apparatus including means for performing the processing of any of the apparatus above.

In another aspect, in general, a method for performing the processing of any of the apparatus above.

In another aspect, in general, software is stored in a non-transitory form on a computer-readable medium, the software including instructions for causing a computing system to perform the processing of any of the apparatus above.

In another aspect, in general, an apparatus includes: means for executing a plurality of data processing programs that each process at least one stream of data units; and means for storing shared data accessible by at least two of the plurality of data processing programs; wherein processing at least one stream of data units using at least a first data processing program of the plurality of data processing programs includes: processing a first stream of data units that includes a plurality of subsets of contiguous data units; initiating termination of processing within the first data processing program, between processing a first subset of contiguous data units and processing a second subset of contiguous data units adjacent to the first subset of contiguous data units within the first stream of data units; durably storing at least some changes to the shared data caused by processing the first subset of contiguous data units after determining that the termination of processing within the first data processing program has completed; and resuming processing within the first data processing program before all of the changes have completed being durably stored.

In another aspect, in general, a method includes: executing, on a computing system including one or more nodes, a plurality of data processing programs that each process at least one stream of data units; and storing, on at least one data storage system accessible to at least one of the one or more nodes, shared data accessible by at least two of the plurality of data processing programs; wherein processing at least one stream of data units using at least a first data processing program of the plurality of data processing programs includes: processing a first stream of data units that includes a plurality of subsets of contiguous data units; initiating termination of processing within the first data processing program, between processing a first subset of contiguous data units and processing a second subset of contiguous data units adjacent to the first subset of contiguous data units within the first stream of data units; durably storing at least some changes to the shared data caused by processing the first subset of contiguous data units after determining that the termination of processing within the first data processing program has completed; and resuming processing within the first data processing program before all of the changes have completed being durably stored.

In another aspect, in general, software is stored in a non-transitory form on a computer-readable medium, the software including instructions for causing a computing system to: execute a plurality of data processing programs that each process at least one stream of data units; and store shared data accessible by at least two of the plurality of data processing programs; wherein processing at least one stream of data units using at least a first data processing program of the plurality of data processing programs includes: processing a first stream of data units that includes a plurality of subsets of contiguous data units; initiating termination of processing within the first data processing program, between processing a first subset of contiguous data units and processing a second subset of contiguous data units adjacent to the first subset of contiguous data units within the first stream of data units; durably storing at least some changes to the shared data caused by processing the first subset of contiguous data units after determining that the termination of processing within the first data processing program has completed; and resuming processing within the first data processing program before all of the changes have completed being durably stored.

Aspects can have one or more of the following advantages.

Computing systems configured for real-time data processing often need to handle relatively large volumes of data in one or more incoming data streams, and also need to be able to respond to incoming requests with low latency. The techniques described herein enable such systems to have recoverability, fault tolerance, and high availability while not compromising the response latency requirements. The techniques can also be applied to collections of multiple interacting data processing programs. One of the mechanisms used for recoverability is checkpointing. High frequency checkpointing (e.g., with a period of around 10 ms to 100 ms) can be achieved, supporting the ability to provide escrowed output with low latency in response to a request.

Other features and advantages of the invention will become apparent from the following description, and from the claims.

DESCRIPTION OF DRAWINGS

FIG. 7A is an exemplary computing system implementing an incremental and pipelined pulsed ingestion checkpointing approach.

FIG. 7C shows the computing system of FIG. 7A in a quiesced state after finishing processing of the first pulse of input data.

FIG. 7E shows the computing system of FIG. 7A releasing output data generated from the first pulse of input data from escrow upon completion of durably storing the state changes related to the first pulse of input data.

DESCRIPTION

1 System Overview

Figure 1:
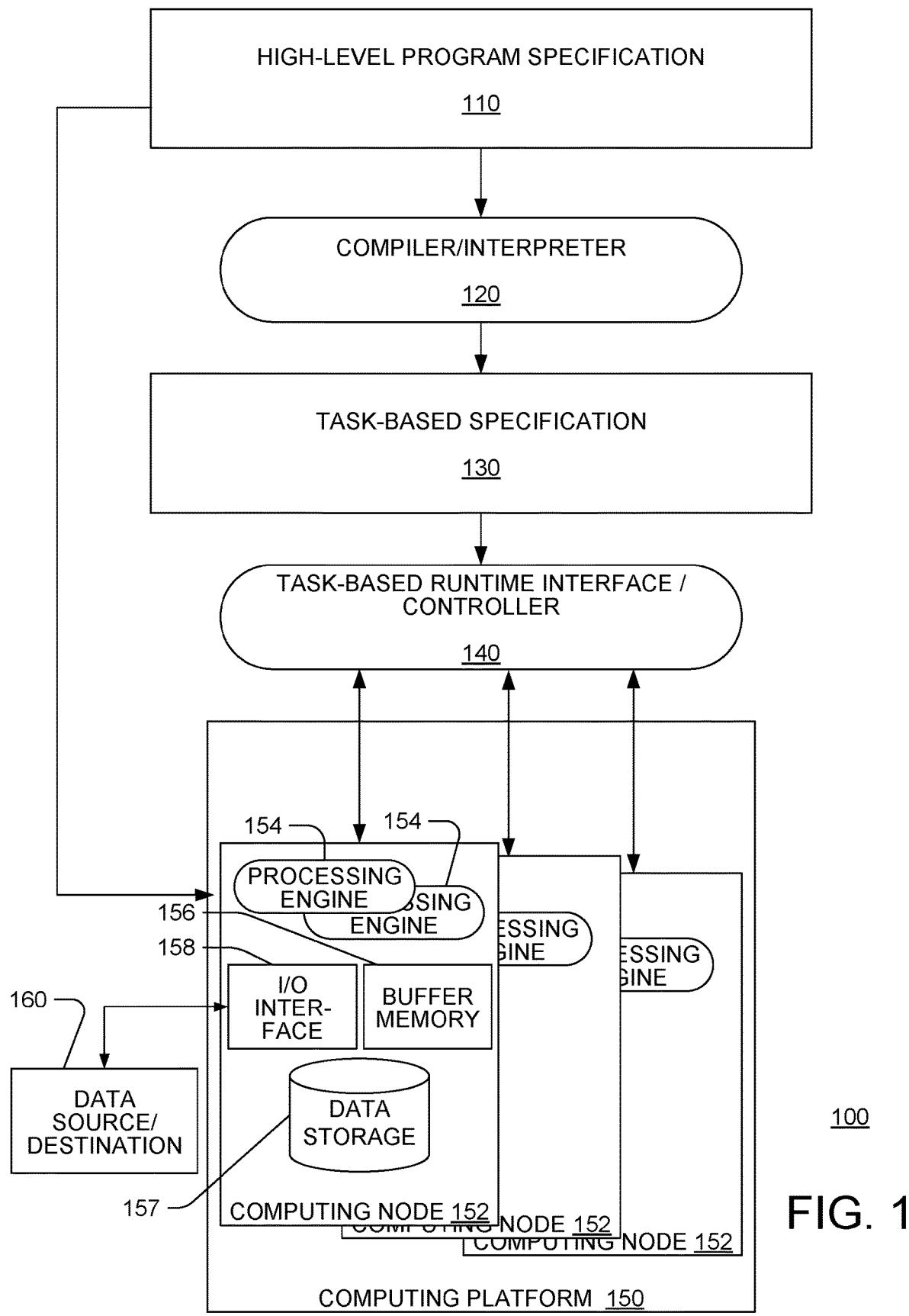
FIG. 1 is a block diagram of a task-based computing system.

Referring to FIG. 1, a task-based computing system 100 uses a high-level program specification 110 to control computation and storage resources of a computing platform 150 to execute the computation specified by the program specification 110. A compiler/interpreter 120 receives the high-level program specification 110 and generates a task-based specification 130 that is in a form that can be executed by a task-based runtime interface/controller 140. The compiler/interpreter 120 identifies one or more "execution sets" of one or more "components" that can be instantiated, individually or as a unit, as fine-grained tasks to be applied to each of multiple data elements. Part of the compilation or interpretation process involves identifying these execution sets and preparing the sets for execution, as described in more detail below. It should be understood that the compiler/interpreter 120 may use any of variety of algorithms that include steps such as parsing the high-level program specification 110, verifying syntax, type checking data formats, generating any errors or warnings, and preparing the task-based specification 130, and the compiler/interpreter 120 can make use of a variety of techniques, for example, to optimize the efficiency of the computation performed on the computing platform 150. A target program specification generated by the compiler/interpreter 120 can itself be in an intermediate form that is to be further processed (e.g., further compiled, interpreted, etc.) by another part of the system 100 to produce the task-based specification 130. The discussion below outlines one or more examples of such transformations but of course other approaches to the transformations are possible as would be understood, for example, by one skilled in compiler design.

Generally, the computation platform 150 is made up of a number of computing nodes 152 (e.g., individual server computers that provide both distributed computation resources and distributed storage resources) thereby enabling high degrees of parallelism. As discussed in further detail below, the computation represented in the high-level program specification 110 is executed on the computing platform 150 as relatively fine-grain tasks, further enabling efficient parallel execution of the specified computation.

2 Data Processing Graphs

In some embodiments, the high-level program specification 110 is a type of graph-based program specification called a "data processing graph" that includes a set of "components", each specifying a portion of an overall data processing computation to be performed on data. The components are represented, for example, in a programming user interface and/or in a data representation of the computation, as nodes in a graph. Unlike some graph-based program specifications, such as the data processing graphs described above, the data processing graphs may include links between the nodes that represent any of transfer of data, or transfer of control, or both. One way to indicate the characteristics of the links is by providing different types of ports on the components. The links are directed links that are coupled from an output port of an upstream component to an input port of a downstream component. The ports have indicators that represent characteristics of how data elements are written and read from the links and/or how the components are controlled to process data.

These ports may have a number of different characteristics. One characteristic of a port is its directionality as an input port or output port. The directed links represent data and/or control being conveyed from an output port of an upstream component to an input port of a downstream component. A developer is permitted to link together ports of different types. Some of the data processing characteristics of the data processing graph depend on how ports of different types are linked together. For example, links between different types of ports can lead to nested subsets of components in different "execution sets" that provide a hierarchical form of parallelism, as described in more detail below. Certain data processing characteristics are implied by the type of the port. The different types of ports that a component may have include:

Collection input or output ports, meaning that an instance of the component will read or write, respectively, all data elements of a collection that will pass over the link coupled to the port. For a pair of components with a single link between their collection ports, the downstream component is generally permitted to read data elements as they are being written by an upstream component, enabling pipeline parallelism between upstream and downstream components. The data elements can also be reordered, which enables efficiency in parallelization, as described in more detail below. In some graphical representations, for example in programming graphical interfaces, such collection ports are generally indicated by a square connector symbol at the component.

Scalar input or output ports, meaning that an instance of the component will read or write, respectively, at most one data element from or to a link coupled to the port. For a pair of components with a single link between their scalar ports, serial execution of the downstream component after the upstream component has finished executing is enforced using transfer of the single data element as a transfer of control. In some graphical representations, for example in programming graphical interfaces, such scalar ports are generally indicated by a triangle connector symbol at the component.

Control input or output ports, which are similar to scalar inputs or outputs, but no data element is required to be sent, and are used to communicate transfers of control between components. For a pair of components with a link between their control ports, serial execution of the downstream component after the upstream component has finished executing is enforced (even if those components also have a link between collection ports). In some graphical representations, for example in programming graphical interfaces, such control ports are generally indicated by a circular connector symbol at the component.

These different types of ports enable flexible design of data processing graphs, allowing powerful combinations of data and control flow with the overlapping properties of the port types. In particular, there are two types of ports, collection ports and scalar ports, that convey data in some form (called "data ports"); and there are two types of ports, scalar ports and control ports, that enforce serial execution (called "serial ports"). A data processing graph will generally have one or more components that are "source components" without any connected input data ports and one or more components that are "sink components" without any connected output data ports. Some components will have both connected input and output data ports. In some embodiments, the graphs are not permitted to have cycles, and therefore must be a directed acyclic graph (DAG). This feature can be used to take advantage of certain characteristics of DAGs, as described in more detail below.

The use of dedicated control ports on components of a data processing graph also enable flexible control of different parts of a computation that is not possible using certain other control flow techniques. For example, job control solutions that are able to apply dependency constraints between data processing graphs don't provide the fine-grained control enabled by control ports that define dependency constraints between components within a single data processing graph. Also, data processing graphs that assign components to different phases that run sequentially don't allow the flexibility of sequencing individual components. For example, nested control topologies that are not possible using simple phases can be defined using the control ports and execution sets described herein. This greater flexibility can also potentially improve performance by allowing more components to run concurrently when possible.

By connecting different types of ports in different ways, a developer is able to specify different types of link configurations between ports of components of a data processing graph. One type of link configuration may correspond to a particular type of port being connected to the same type of port (e.g., a scalar-to-scalar link), and another type of link configuration may correspond to a particular type of port being connected to a different type of port (e.g., a collection-to-scalar link), for example. These different types of link configurations serve both as a way for the developer to visually identify the intended behavior associated with a part of the data processing graph, and as a way to indicate to the compiler/interpreter 120 a corresponding type of compilation process needed to enable that behavior. While the examples described herein use unique shapes for different types of ports to visually represent different types of link configurations, other implementations of the system could distinguish the behaviors of different types of link configurations by providing different types of links and assigning each type of link a unique visual indicator (e.g., thickness, line type, color, etc.). However, to represent the same variety of link configurations possible with the three types of ports listed above using link type instead of port type, there would be more than three types of links (e.g., scalar-to-scalar, collection-to-collection, control-to-control, collection-to-scalar, scalar-to-collection, scalar-to-control, etc.) Other examples could include different types of ports, but without explicitly indicating the port type visually within a data processing graph.

The compiler/interpreter 120 performs procedures to prepare a data processing graph for execution. A first procedure is an execution set discovery pre-processing procedure to identify a hierarchy of potentially nested execution sets of components. A second procedure is a control graph generation procedure to generate, for each execution set, a corresponding control graph that the compiler/interpreter 120 will use to form control code that will effectively implement a state machine at runtime for controlling execution of the components within each execution set. Each of these procedures will be described in greater detail below.

A component with at least one input data port specifies the processing to be performed on each input data element or collection (or tuple of data elements and/or collections on multiple of its input ports). One form of such a specification is as a procedure to be performed on one or a tuple of input data elements and/or collections. If the component has at least one output data port, it can produce corresponding one or a tuple of output data elements and/or collections. Such a procedure may be specified in a high level statement-based language (e.g., using Java source statements, or a Data Manipulation Language (DML) for instance as used in U.S. Pat. No. 8,069,129 "Editing and Compiling Business Rules"), or may be provided in some fully or partially compiled form (e.g., as Java bytecode). For example, a component may have a work procedure whose arguments include its input data elements and/or collections and its output data elements and/or collections, or more generally, references to such data elements or collections or to procedures or data objects (referred to herein as "handles") that are used to acquire input and provide output data elements or collections.

Work procedures may be of various types. Without intending to limit the types of procedures that may be specified, one type of work procedure specifies a discrete computation on data elements according to a record format. A single data element may be a record from a table (or other type of dataset), and a collection of records may be all of the records in a table. For example, one type of work procedure for a component with a single scalar input port and a single scalar output port includes receiving one input record, performing a computation on that record, and providing one output record. Another type of work procedure may specify how a tuple of input records received from multiple scalar input ports are processed to form a tuple of output records sent out on multiple scalar output ports.

The semantic definition of the computation specified by the data processing graph is inherently parallel in that it represents constraints and/or lack of constraints on ordering and concurrency of processing of the computation defined by the graph. Therefore, the definition of the computation does not require that the result is equivalent to some sequential ordering of the steps of the computation. On the other hand, the definition of the computation does provide certain constraints that require sequencing of parts of the computation, and restrictions of parallel execution of parts of the computation.

In the discussion of data processing graphs, implementation of instances of components as separate "tasks" in a runtime system is assumed as a means of representing sequencing and parallelization constraints. A more specific discussion of an implementation of the data processing graph into a task-based specification, which implements the computation consistently with the semantic definition, is discussed more fully after the discussion of the characteristics of the graph-based specification itself.

Generally, each component in a data processing graph will be instantiated in the computing platform a number of times during execution of the graph. The number of instances of each component may depend on which of multiple execution sets the component is assigned to. When multiple instances of a component are instantiated, more than one instance may execute in parallel, and different instances may execute in different computing nodes in the system. The interconnections of the components, including the types of ports, determine the nature of parallel processing that is permitted by a specified data processing graph.

Although in general state is not maintained between executions of different instances of a component, as discussed below, certain provisions are provided in the system for explicitly referencing 'persistent data' that may span executions of multiple instances of a component. One way to ensure that such persistent data will be available for later executions, and/or recoverable in the event of certain faults, is to durably store such persistent data in a durable storage medium (e.g., a medium in which information can be stored without loss in the event of one or more predetermined faults such as power interruptions, such as a non-volatile storage medium).

In examples where a work procedure specifies how a single record is processed to produce a single output record, and the ports are indicated to be collection ports, a single instance of the component may be executed, and the work procedure is iterated to process successive records to generate successive output records. In this situation, it is possible that state is maintained within the component from iteration to iteration.

In examples where a work procedure specifies how a single record is processed to produce a single output record, and the ports are indicated to be scalar ports, multiple instances of the component may be executed, and no state is maintained between executions of the work procedure for different input records.

Also, in some embodiments, the system supports work procedures that do not follow a finest-grained specification introduced above. For example, a work procedure may internally implement an iteration, for example, which accepts a single record through a scalar port and provides multiple output records through a collection port.

As noted above, there are two types of data ports, collection ports and scalar ports, that convey data in some form; and there are two types of serial ports, scalar ports and control ports, that enforce serial execution. In some cases, a port of one type can be connected by a link to a port of another type. Some of those cases will be described below. In some cases, a port of one type will be linked to a port of the same type. A link between two control ports (called a "control link") imposes serial execution ordering between linked components, without requiring data to be sent over the link. A link between two data ports (called a "data link") provides data flow, and also enforces a serial execution ordering constraint in the case of scalar ports, and does not require serial execution ordering in case of collection ports. A typical component generally has at least two kinds of ports including input and output data ports (either collection ports or scalar ports) and input and output control ports. Control links connect the control port of an upstream component to a control port of a downstream component. Similarly, data links connect the data port of an upstream component to a data port of a downstream component.

3 Computing Platform

Referring back to FIG. 1, instances of components of the data processing graph are spawned as tasks in the context of executing a data processing graph and are generally executed in multiple of the computing nodes 152 of the computing platform 150. As discussed in more detail below, the interface/controller 140 provides supervisory control aspects of the scheduling and locus of execution of those tasks in order to achieve performance goals for the system, for example, related to allocation of computation load, reduction in communication or input/output overhead, and use of memory resources.

Generally, after translation by the compiler/interpreter 120, the overall computation is expressed as a task-based specification 130 in terms of procedures of a target language that can be executed by the computing platform 150. These procedures make use of primitives, such as "spawn" and "wait" and may include within them or call the work procedures specified by a programmer for components in the high-level (e.g., graph-based) program specification 110.

In many instances, each instance of a component is implemented as a task, with some tasks implementing a single instance of a single component, some tasks implementing a single instance of multiple components of an execution set, and some tasks implementing successive instances of a component. The particular mapping from components and their instances depends on the particular design of the compiler/interpreter, such that the resulting execution remains consistent with the semantic definition of the computation.

Generally, tasks in the runtime environment are arranged hierarchically, for example, with one top-level task spawning multiple tasks, for example, one for each of the top-level components of the data processing graph. Similarly, computation of an execution set may have one task for processing an entire collection, with multiple (i.e., many) sub-tasks each being used to process an element of the collection.

In the runtime environment, each task that has been spawned may be in one of a set of possible states. When first spawned, a task is in a Spawned state prior to being initially executed. When executing, it is in an Executing state. From time to time, the task may be in a Suspended state. For example, in certain implementations, a scheduler may put a task into a Suspended state when it has exceeded quantum of processor utilization, is waiting for a resource, etc. In some implementations, execution of tasks is not preempted, and a task must relinquish control. There are three Suspended sub-states: Runnable, Blocked, and Done. A task is Runnable, for example, if it relinquished control before it had completed its computation. A task is Done when it has completed its processing, for example, prior to the parent task retrieving a return value of that task. A task is Blocked if it is waiting for an event external to that task, for example, completion of another task (e.g., because it has used the "wait for" primitive), or availability of a data record (e.g., blocking one execution of an in.read( ) or out.write( ) function).

Referring again to FIG. 1, each computing node 152 has one or more processing engines 154. Each computing node 152 also includes buffer memory 156 (e.g., volatile storage medium), data storage 157 (e.g., non-volatile storage medium), and in I/O interface 158, which may access a source and/or destination 160 for data being consumed and/or produced by the computing platform 150. Either or both of the buffer memory 156 and/or data storage 157 on one or more of the computing nodes 152 may be configured to be accessible my multiple of the computing nodes 152. In at least some implementations, each processing engine 154 is associated with a single operating system process executing on the computing node 152. Depending on the characteristics of the computing node 152, it may be efficient to execute multiple processing engines 154 on a single computing node 152. For example, the computing node 152 may be a server computer with multiple separate processors, or the server computer may have a single processor that has multiple processor cores, or there may be a combination of multiple processors with multiple cores. In any case, executing multiple processing engines may be more efficient than using only a single processing engine on a computing node 152.

One example of a processing engine is hosted in the context of a virtual machine. One type of virtual machine is a Java Virtual Machine (JVM), which provides an environment within which tasks specified in compiled form as Java Bytecode may be executed. But other forms of processing engines, which may or may not use a virtual machine architecture can be used.

4 Recovery

In some examples, the computing system 100 described above implements a recovery algorithm to ensure that, if a processing failure occurs (e.g., a computing node fails during a processing operation), the system can be restarted such that it produces results which could have been produced if the system had not failed or had gone to sleep or slowed down for a period of time.

One simple recovery algorithm includes processing the data as an atomic unit of work such that, after a failure, all of the work done by the data processing graph is rolled back. In this batch processing approach, the computing system achieves recoverability by restoring any files that were changed during the failed processing to their state before the processing began. In this way, the recovery algorithm can assure that all work done and changes made during the failed processing are discarded. This type recovery algorithm it is especially useful when data is being processed by a single data processing graph which processes all of the data in a relatively short amount of time.

However, when dealing with multiple graphs which update persistent, shared resources or when dealing which graphs which process data over a long (possibly indefinite) duration, it is impractical and sometimes impossible to treat the processing of the data as an atomic unit of work that can be entirely rolled back after a failure.

4.1 Entanglement

For example, when the computing system concurrently processes one or more shared resources using multiple data processing graphs, including updating persistent, shared data, recoverability is lost due to a condition referred to as 'entanglement.' Shared data is data that is able to be read and written (or modified) by each of at least two different data processing graphs. The shared data may be, for example, variables whose values are read and written by different data processing graphs as a form of shared state and/or shared communication among the data processing graphs.

For an example of entanglement, consider a situation where two data processing graphs are processing independent sets of shared data, where each data processing graph makes changes to the shared data atomically. A situation can occur where a first of the two data processing graphs processes a set of data, makes changes in an atomic update, and commits its changes to confirm they have been made persistent (e.g., durably stored), after which a failure occurs in the execution of a second of the two data processing graphs. If the system implements a recovery procedure that restores any data (including the shared data) that was changed during the failed processing of the second data processing graph to its state before the processing began, then at least some of the changes that the first data processing graph made to the shared data will be undone, resulting in an inconsistency. On the other hand, if the system doesn't restore any data (including the shared data) that was changed during the failed processing of the second data processing graph to its state before the processing began, then the output of the second data processing graph may be incorrect due to the state of the shared data being incorrect at the beginning of its processing. Thus, due to entanglement, data processing graphs operating on shared data can not be independently restored after a failure.

One approach to recovery in the presence of entangled processes includes isolating the multiple data processing graphs from one another so the graphs can not see one another's changes. However, it is often the case that the data processing graphs are operating on the same data items and isolation is therefore not possible. Furthermore, in some examples the multiple data processing graphs run for a relatively long duration which is likely to result in either one data processing graph waiting for another to release a lock or one data processing graph being rolled back due to a deadlock (using pessimistic concurrency control) or a commit-time collision (using optimistic concurrency control). Other approaches to recovery in the presence of entangled processes include running the multiple data processing graphs as a part of a single atomic unit of work or running the multiple data processing graphs serially.

4.2 Long Running Graphs

In some examples, data processing graphs executing in the computing system 100 process continuous streams of data without any well-defined ending point. These data processing graphs are sometimes referred to as 'ingestion graphs.' When processing a continuous stream of data, it is inappropriate to treat processing of all of the data as a single, atomic unit of work and the recovery approaches described above are inadequate for successfully recovering from a failure in the computing system.

One approach for recovering from a failure in such a computing system includes dividing the continuous stream of input data into a series of smaller 'pulses' of input data and processing the series of pulses of input data individually. At the completion of processing a given pulse of input data, a checkpoint of the graph's internal state is created. In the event of a failure, the computing system can use the checkpoint to restore the internal state of the graph and restart processing at an intermediate point in the processing of the continuous data stream. In some examples, if the computing system includes entangled long running graphs, it must coordinate checkpoints to ensure that all of the graphs share common commit times.

As used herein, the input data to be divided into pulses, also referred to as a "stream of data units," will be considered to include, for example, any sequence of input records that are read after being received from an external source, or any units of data that have been read by accessing stored state of any shared variables or any internal system state that acts as a source of input data.

Figure 2:
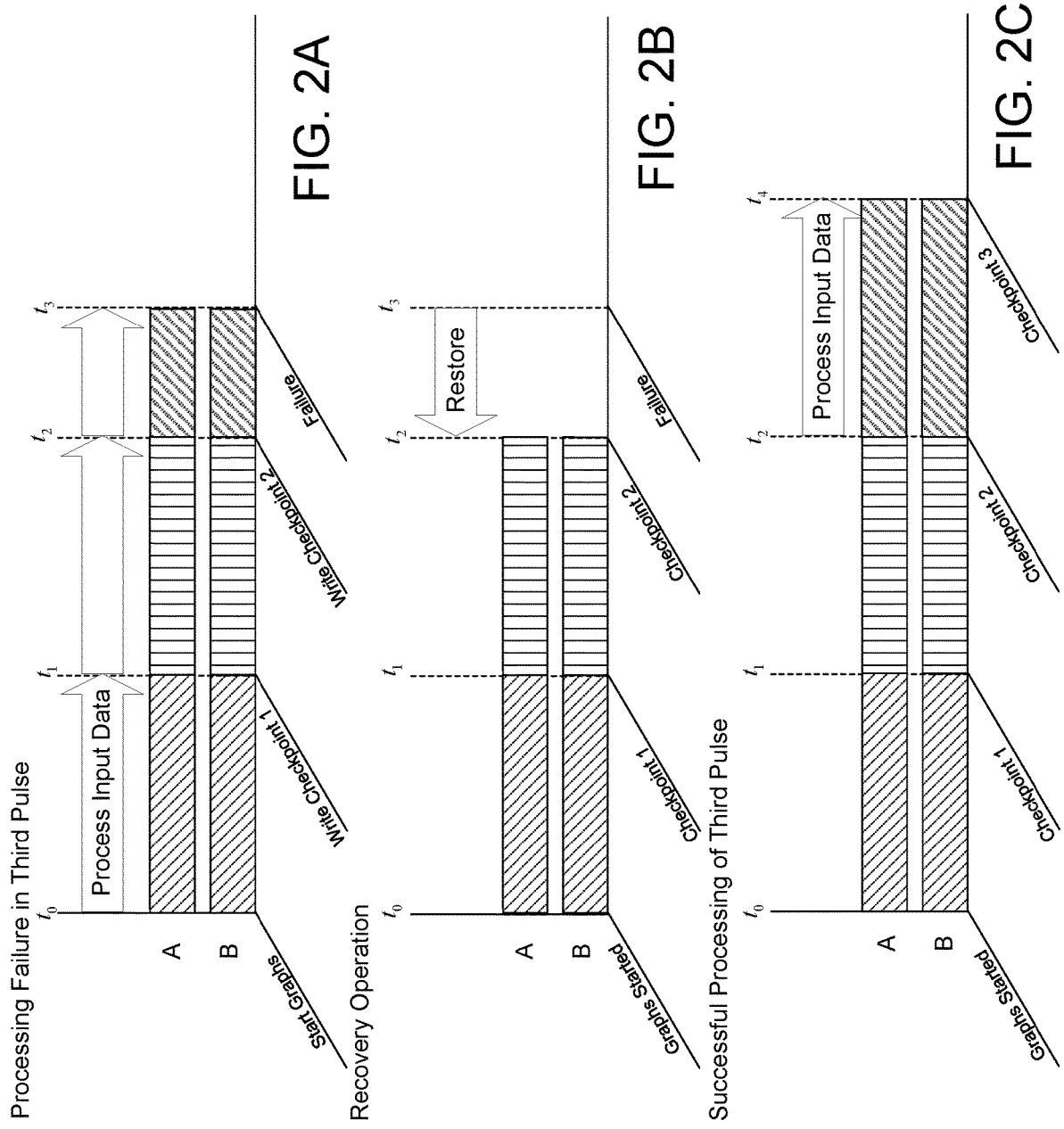
FIG. 2A is a processing timeline showing successful processing of first and second pulses of input data and failed processing of a third pulse of input data in a pulsed ingestion computing system.
FIG. 2B is the processing timeline of FIG. 2A showing a recovery operation restoring a state of the processing to a checkpoint associated with the successful processing of the second pulse of input data.
FIG. 2C is the processing timeline of FIG. 2A showing a successful reprocessing of the third pulse of output data.

For example, referring to FIG. 2A, the computing system 100 starts a first graph, labeled 'A' and a second graph labeled 'B' at time, $t_0$ and the graphs begin processing a first pulse of input data. At time $t_1$, both the first graph and the second graph complete processing the first pulse of input data and write a first checkpoint. With the first checkpoint written, the first graph and the second graph begin processing a second pulse of input data. At time $t_2$, both the first graph and the second graph complete processing the second pulse of input data and write a second checkpoint. With the second checkpoint written, the first graph and the second graph begin processing a third pulse of input data. At time $t_3$, a failure in the processing of the third pulse of input data occurs.

Referring to FIG. 2B, to recover from the failure, the computing system uses the second checkpoint to restore the first graph and the second graph to their respective states at the completion of processing the second pulse of input data.

Referring to FIG. 2C, with the first graph and the second graph restored to their respective states at the completion of processing the second pulse of input data, the graphs successfully re-process the third pulse of input data and write a third checkpoint at time $t_4$.

4.3 General Checkpointing Algorithm

One approach to saving checkpoint data includes having a 'checkpoint master' node (e.g., one of the computing nodes in the system) first initiate the checkpoint by broadcasting a new checkpoint message to all other computing nodes in the computing system. Once received at the computing nodes, the new checkpoint message causes the servers to suspend all computing activity. The computing system then waits for all messages in transit between computing nodes in the system to be delivered.

Once all messages have been delivered, each computing node saves its task state, pending messages, persistent data, and transient state to a checkpoint file. The master computing node then writes a journal entry committing the checkpoint and sends a message to all of the computing nodes in the system to resume processing.

While the above-described approach does result in a checkpointing procedure that is capable of recovering from failures in processing a continuous stream of input data, there are a number of drawbacks associated with the approach. For example, the above approach requires suspension of processing for a relatively long duration, during which the computing system is unable to complete useful processing. Furthermore, saving the task state of the computing nodes is computationally intensive and would result in the computing system expending an inordinate amount of time saving the task state and not processing input data. Finally, the computing system has a large amount of transient state such as the state of the transactional data store commit manager, in-flight updates to transactional data store tables and indexes, in-flight service calls, in-flight data moving from one server to another, in-flight processes migrating from one server to another, and in-flight accesses to shared data (e.g., data accessible to two or more tasks (associated with components of the data-processing graph) executing in the computing system 100). In some examples, saving this transient state is computationally expensive and complex.

4.4 Pulsed Ingestion Algorithm

A pulsed ingestion algorithm relies on a number of properties of the graphs executing in the computing system to avoid the drawbacks associated with the general checkpointing algorithm. One property of ingestion graphs executing in the computing system is that they ingest data one record at a time (e.g., ingestion includes repeatedly reading a record and updating shared persistent data). Another property of the ingestion graphs executing in the computing system is that they are stateless from one record to the next. That is, all state is maintained in persistent data (e.g., shared data collections and transactional data store tables) that is accessible to the graphs. Furthermore, in some examples, data processing graphs executing in the computing system include only components that are stateless from one record to the next.

Based on these properties of the graphs executing in the computing system, there is no difference between ingesting the entire input data stream in a single run of the graphs and ingesting a pulse of input data from the input data stream, cleanly shutting down the graphs (i.e., allowing all processes to exit normally after completing any processing associated with the pulse of data), and then restarting the graphs to process a subsequent pulse of the input data stream. Since the graphs are allowed to cleanly shut down in a pulsed ingestion approach, the computing system does not need to save a large amount of internal graph state during the checkpointing process.

4.4.1 Single Graph Pulsed Ingestion Algorithm

Figure 3:
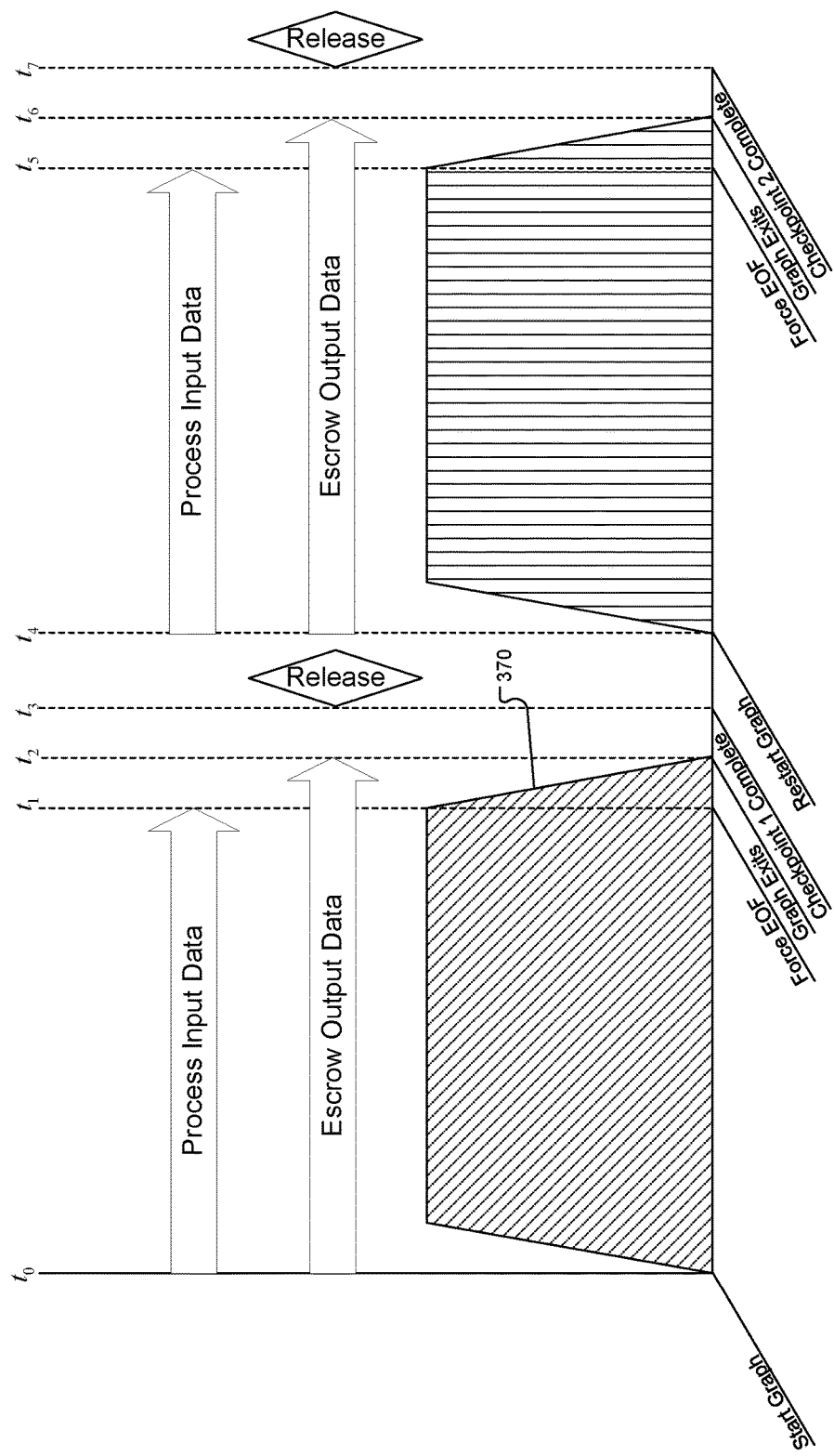
FIG. 3 is a processing timeline of a general pulsed ingestion checkpointing approach.

Referring to FIG. 3, a pulsed ingestion algorithm for processing a stream of input data in a single graph includes starting the graph at a time, $t_0$. Once started, the graph processes a first pulse of input data from the stream of input data to generate output data, which it stores in escrow (i.e., the output is not immediately provided to downstream processes). At time $t_1$, a pulse-ending indicator (e.g., an end-of-file (EOF) character) is inserted into the stream of input data, indicating the end of the first pulse of input data. When the graph encounters the pulse-ending indicator at time $t_1$, it ceases ingesting new data from the input data stream. From time $t_1$ to time $t_2$ the graph then finishes processing all data that it was already processing at time $t_1$ (i.e., the graph is allowed to 'quiesce'). The quiescing period between times $t_1$ and $t_2$ is shown as a ramp down 370 in a processing load in FIG. 3.

At time $t_2$, once the graph has quiesced, the computing system begins writing a checkpoint including all persistent data, a state of the streaming input data (e.g., a current position), and a state of the output data are written to durable storage. At time $t_3$, upon completion of writing the checkpoint to durable storage, the escrowed output data associated with the first pulse of input data is released to downstream processes. Then, at time $t_4$, the graph is restarted and begins processing a second pulse of input data from the stream of input data (following the procedure described above).

In general, given that the graph is allowed to quiesce prior to writing the checkpoint, process state, messages, and transients do not exist in the system since the graph isn't running. In some examples, there is very little overhead associated with shutting down and restarting the graph since every pulse of input data is very small (e.g., there are 100 pulses per second). This can result a high frequency of checkpointing (e.g., a 10 ms checkpoint interval) which is ideal for applications which require a sufficiently short response latency. For example, certain applications require that the overhead of restarting (i.e., shutting down graphs, waiting for processes to exit normally, and starting up again) is significantly less than 10 ms (e.g., less than 1 ms). Furthermore, the time required to write the checkpoint is also small when compared to the checkpoint interval (e.g., 1 ms). In some examples, the restart timing requirement is achieved by storing certain startup related processing results and reusing (rather than re-computing) those results for subsequent pulses of input data for a faster startup. In some examples, the stored results are recomputed at a low frequency (e.g., every 10 sec or every minute).

Figure 4:
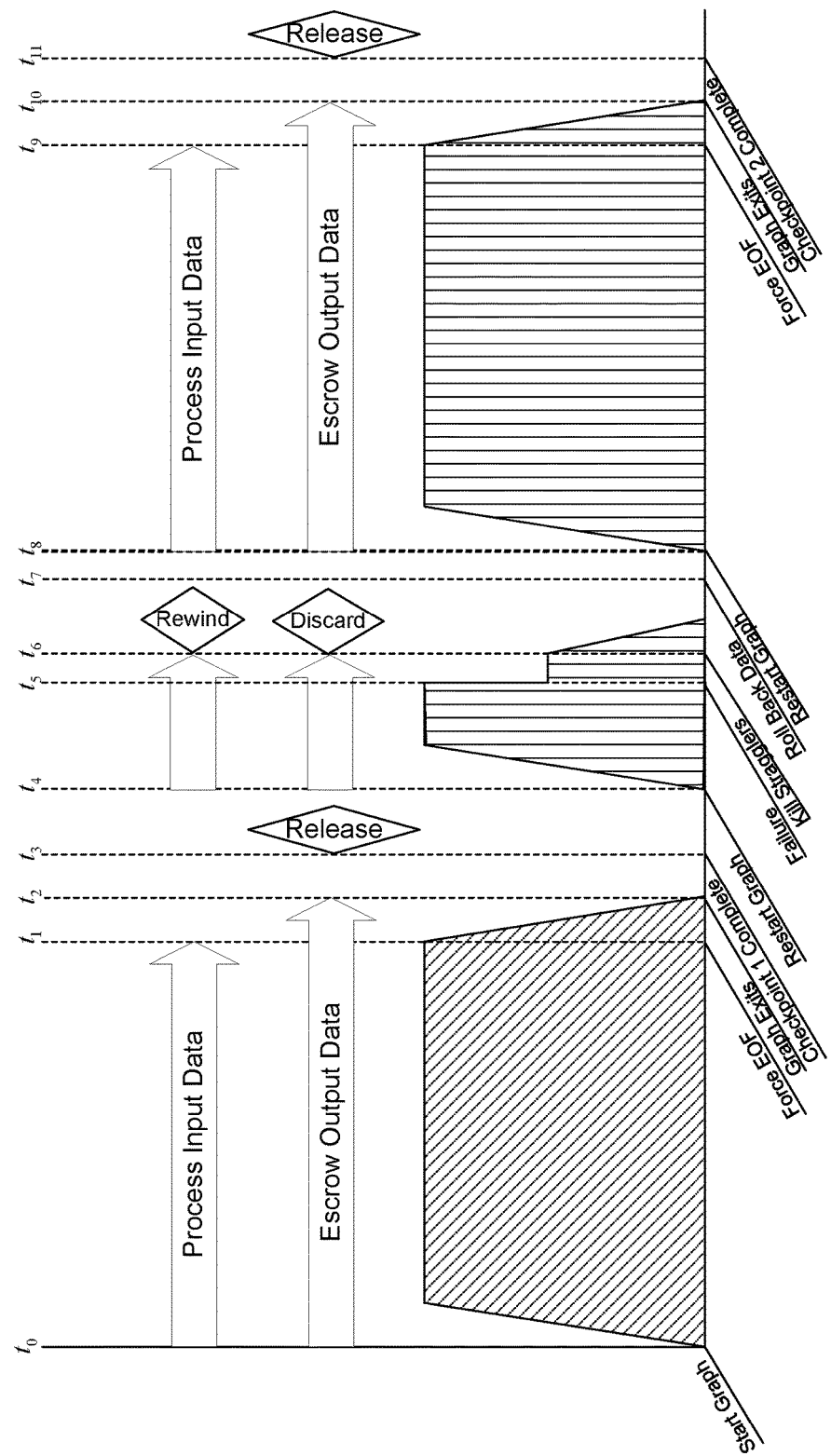
FIG. 4 is a processing timeline of a recovery procedure in the general pulsed ingestion checkpointing approach of FIG. 3.

Referring to FIG. 4, in an example of a recovery procedure, the computing system processes a first pulse of input data using a single graph (as is described above) and stores a first checkpoint at time $t_3$. At time $t_4$, the system begins processing a second pulse of input data using the graph. Then, at time $t_5$, a failure occurs in the processing of the second pulse. Due to the failure, the system shuts down all computation (e.g., stops processing on any computing nodes that did not fail) at time $t_6$ and uses the first checkpoint to restore the state of its input and output data to the state of the system at the completion of processing the first pulse of data (i.e., at time $t_2$). To do so, the system rewinds the second pulse of input data to its initial state (i.e., at time $t_4$) and discards any escrowed output data for the second pulse of input data. At time $t_7$, the checkpoint is used to restore the system's persistent data to its state at the completion of processing the first pulse of data.

At time $t_8$, with the system fully restored to its state at the completion of processing the first pulse of data, the graph restarts and begins re-processing the second pulse of input data. In FIG. 4, the re-processing of the second pulse of input data succeeds.

4.4.2 Multiple Graph Pulsed Ingestion Algorithm

Figure 5:
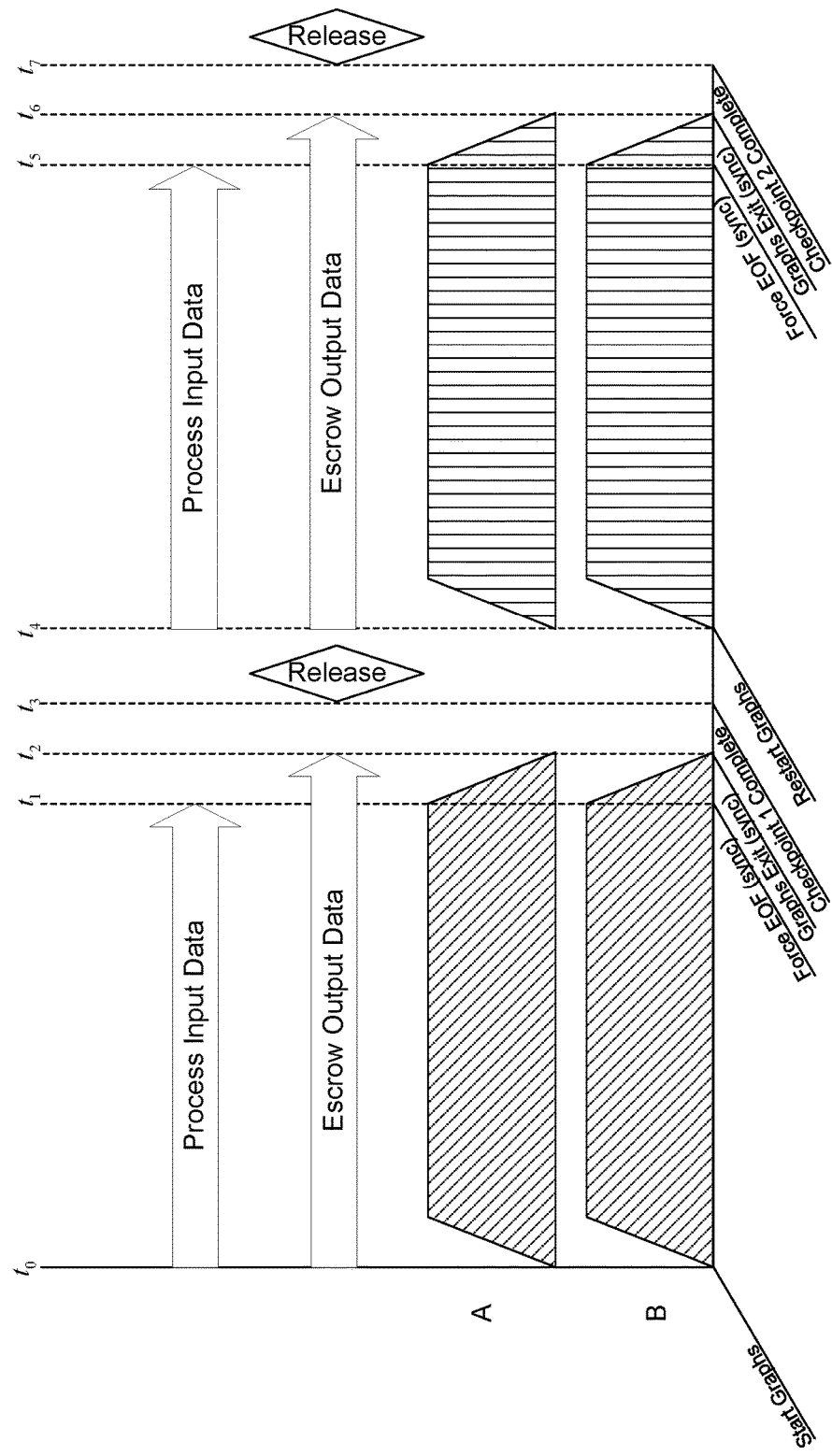
FIG. 5 is a processing timeline of a multiple graph version of the general pulsed ingestion checkpointing approach of FIG. 3.

Referring to FIG. 5, in some examples, when the system includes a collection of multiple graphs (e.g., multiple ingestion graphs), the system is configured to process pulses of data in synchrony through the collection of graphs.

In particular, a pulsed ingestion algorithm for processing one or more streams of input data in a collection of multiple graphs includes starting all of the graphs in the collection at a time, $t_0$. Once started, each of the graphs processes a first pulse of input data from one or more streams of input data to generate respective one or more output data stream, which are stored in escrow (i.e., the output data streams are not immediately provided to downstream processes). At time $t_1$, a pulse-ending indicator is inserted into the streams of input data, indicating the end of the first pulses of input data. In some examples, a barrier synchronization operation is used to ensure that pulse-ending indicators are synchronously inserted into two or more of the input data streams. When the graphs encounter the pulse-ending indicators at time $t_1$, they cease ingesting new data from the input data streams. From time $t_1$ to time $t_2$ the graphs then finish processing all data that they were already processing at time $t_1$ (i.e., the graphs are allowed to 'quiesce'). The quiescing period between times $t_1$ and $t_2$ is shown as a ramp down 570 in a processing load in FIG. 5.

In some examples another barrier synchronization is used to wait for all of the graphs to exit. Once the graphs have all exited at time $t_2$, a checkpoint is written in which all persistent data, a state of the streaming input data (e.g., a current position), and a state of the output data are written to durable storage. At time $t_3$, upon completion of writing the checkpoint to durable storage, the escrowed output data streams associated with the first pulses of input data are released to downstream processes. Then, at time $t_4$, the graphs are synchronously restarted using another barrier synchronization operation and begin processing second pulses of input data from the streams of input data (following the procedure described above).

4.4.3 Incremental and Pipelined Checkpoints

In some examples, it is not practical to save the entire contents of the persistent data for every checkpoint operation since doing so could take minute or even hours, whereas the system may need to make ingested data available within as little as a fraction of a second.

One approach to reducing the amount of data saved for every checkpoint is to incrementally write changes to the persistent data to a journal as a particular pulse of input data is processed. Doing so limits the amount of data written for a given checkpoint to the amount of data changed in the processing of a particular pulse of input data. One advantage of doing so is that entries to the journal (representing changes to the persistent data) are at least in the process of being durably stored before the system begins forming and storing a checkpoint. Furthermore, incrementally writing changes to a journal avoids incurring the overhead of maintaining a 'dirty list' of changed data items and walking that list when the checkpoint is formed. Another advantage of incrementally writing changes to a journal is that entries to the journal can be tagged with a 'checkpoint marker' which can be used to identify a boundary between journal entries for different pulses. When using checkpoint markers, the system can begin processing a second pulse while journal entries for a first, previous pulse are still being durably stored.

Figure 6:
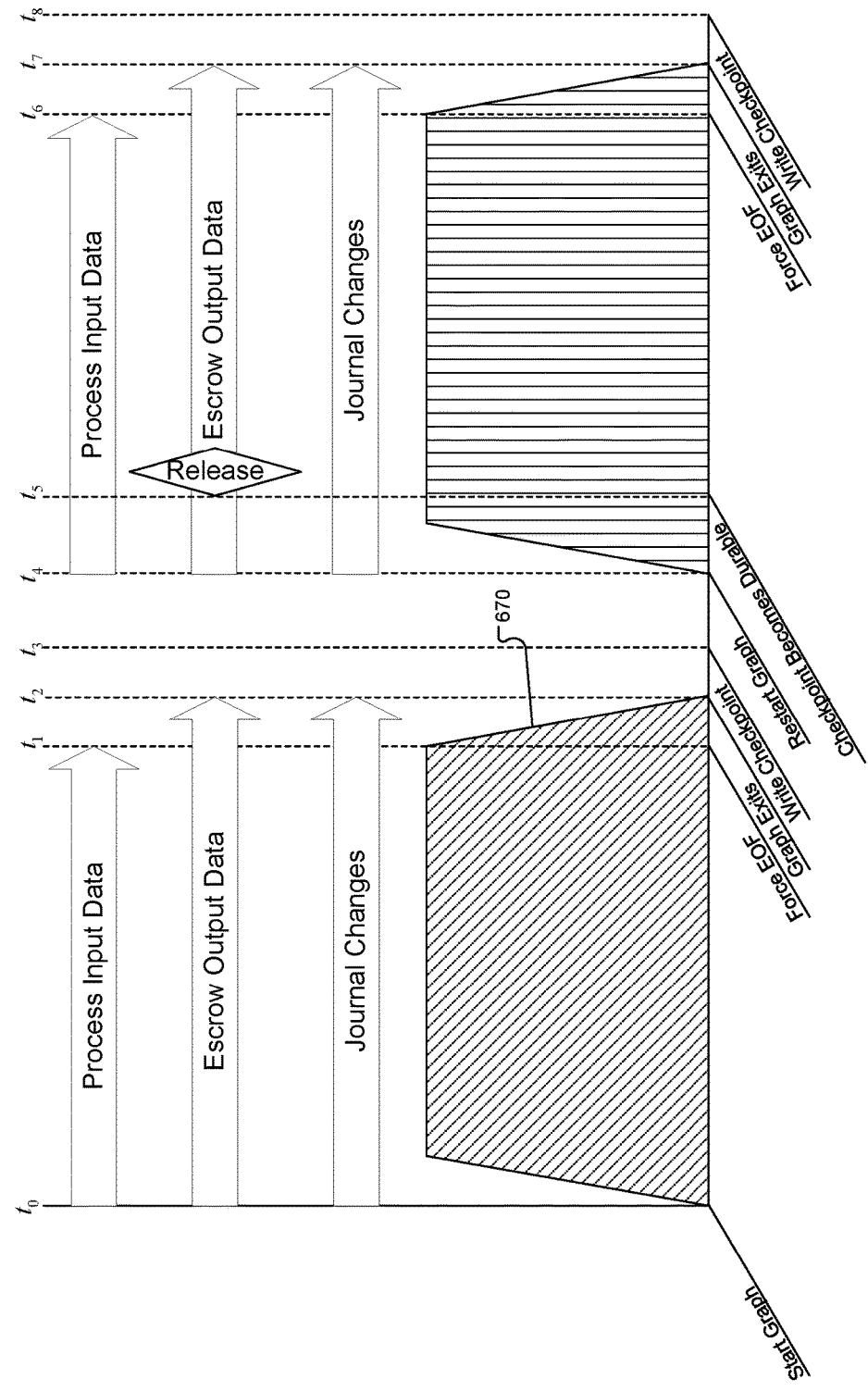
FIG. 6 is a processing timeline of an incremental and pipelined pulsed ingestion checkpointing approach.

Referring to FIG. 6, a pulsed ingestion algorithm with incremental and pipelined checkpointing includes starting the graphs at a time, $t_0$. Once started, the graphs process first pulses of input data from the streams of input data to generate one or more streams of output data, which are stored in escrow. Furthermore, changes to the persistent data that occur during the processing of the first pulses of input data are asynchronously stored as entries in a journal as they occur.

At time $t_1$, pulse-ending indicators are inserted into the streams of input data, indicating the end of the first pulses of input data. When the graphs encounter the pulse-ending indicators at time $t_1$, they cease ingesting new data from the input data streams. From time $t_1$ to time $t_2$ the graphs then finish processing all data that that they were already processing at time $t_1$ (i.e., the graphs are allowed to 'quiesce'). The quiescing period between times $t_1$ and $t_2$ is shown as a ramp down 670 in a processing load in FIG. 6.

At time $t_3$, once the graphs have quiesced, a checkpoint record including a checkpoint counter is written to the journal and the system begins durably storing the checkpoint record (including durably storing all persistent data, a state of the streaming input data (e.g., a current position), and a state of the output data). At time $t_4$, and before the checkpoint record is durably stored, the graphs are restarted and begin processing second pulses of input data from the streams of input data. At time $t_5$, the system completes durably storing the checkpoint record and the escrowed output data associated with the first pulses of input data is released to downstream processes. The system continues processing the second pulses of input data according to the algorithm described above.

In some examples, the algorithm described above is modified to allow for multiple checkpoints to be simultaneously in progress. To do so, different sets of durably stored data are distinguished from one another. For example, any output data kept in escrow is tagged with a checkpoint counter, checkpoint records written to the journal are tagged with a checkpoint counter.

Whenever all checkpoint records for a given checkpoint, n become durable, the given checkpoint is committed and all output data tagged with the given checkpoint's checkpoint counter is released from escrow. Note that in this approach, rather than waiting until the checkpoint records from the current checkpoint to become durable before performing a subsequent iteration of the checkpointing algorithm, this final step is performed asynchronously with the iterations of the checkpointing algorithm. While the writing of the checkpoint records from different checkpoint iterations do not overlap, the processing to store the checkpoint records durably is allowed to overlap.

4.4.3.1 Incremental and Pipelined Checkpoints Example

Referring to FIG. 7A, in one example of an incremental and pipelined checkpointing approach, the computing system 100 receives a stream of input data 112 from an input flow 111, processes the stream of input data 112, and provides a stream of output data to an output flow 131. The computing system 100 includes a number of computing nodes 121 which process the input data in a distributed fashion to generate the output data, for example, as is described in greater detail above for the computing nodes 152.

In operation, the computing system 100 ingests data from the stream of input data one or a few records at a time using ingestion graphs. The ingested data is processed using one or more data processing graphs running on the computing nodes 121 of the computing system 102. The input data stream 112 is segmented into pulses including a first pulse of input data 112A, a second pulse of input data 112B, and a third pulse of input data 112C, all separated by pulse ending indicators. In some examples, the pulse-ending indicators are inserted into the input data stream 112 according to existing or inherent structure of the input data (e.g., each record, every n records, etc.). In some examples, the system dynamically or arbitrarily determines where to insert pulse-ending indicators into the input data stream 112. In some examples, the system inserts pulse-ending indicators when the system is momentarily quiescent. Each 'pulse' of input data includes a subset of contiguous data units within the input data stream 112. As used herein, each subset of 'contiguous' data units includes data units that are in-sequence according to some ordering within the input data stream 112, and that do not overlap with any other subset of contiguous data units.

In some examples, the size of the pulses (sometimes called the "checkpoint interval") are determined based on a trade-off between the degradation to throughput that frequent checkpointing incurs, and the response latency required by the application (which is limited by the checkpoint interval since at any given time, a response from the graph might not be supplied until a full checkpoint is performed).

Figure 7B:
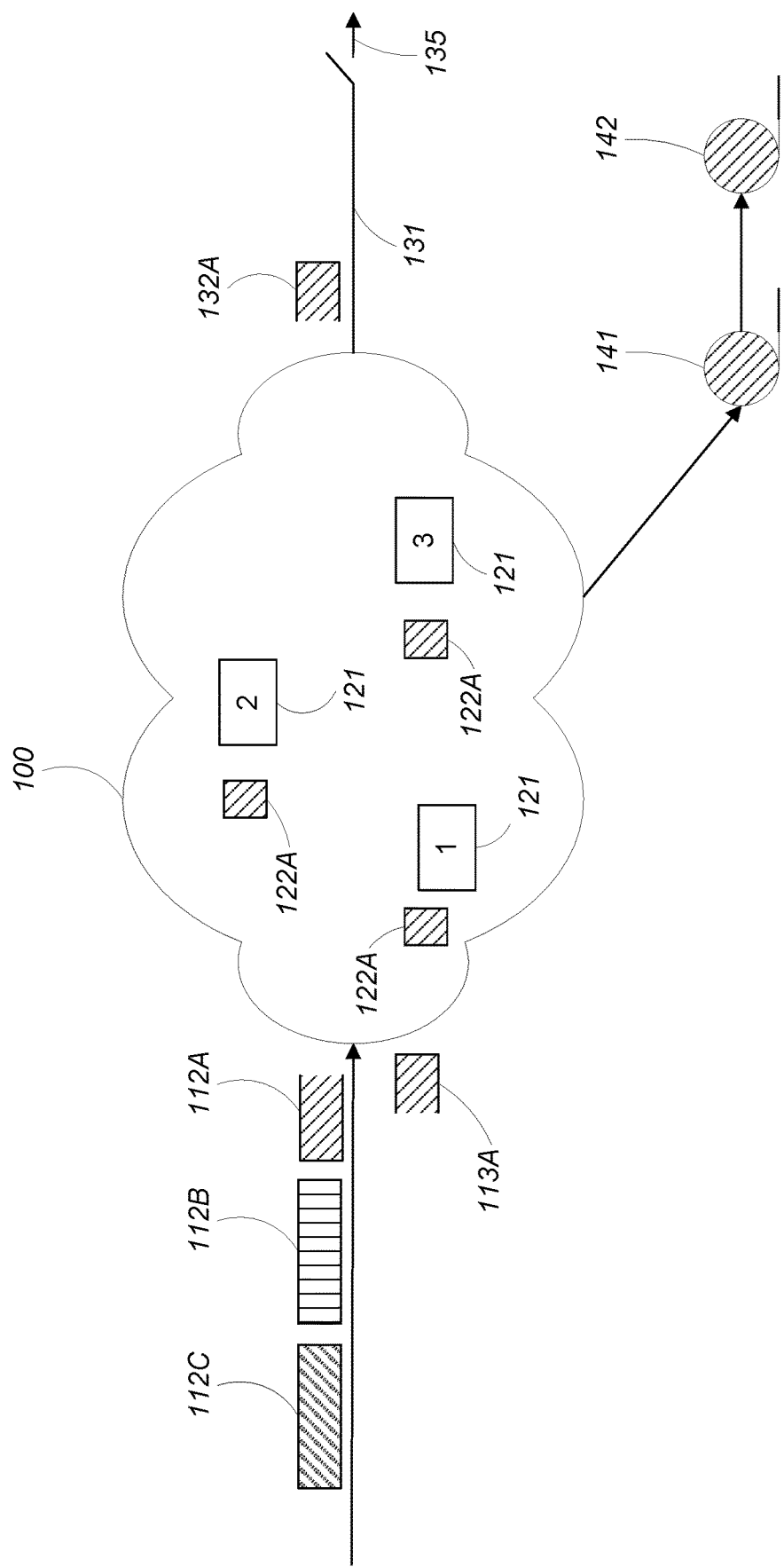
FIG. 7B is the computing system of FIG. 7A processing a first pulse of input data and journaling state changes related to the processing of the first pulse.

Referring to FIG. 7B, as the computing system 100 ingests data from the first pulse 112A of the data stream, the ingested data 122A (e.g., individual records) are provided to the computing nodes 121 for processing according to the one or more data processing graphs. A copy of the ingested data 113A from the first pulse 112A is also durably stored for later retrieval if a recovery operation is required.

A stream of output data 132A generated by the computing nodes 121 is provided to the output flow 131 but is held in escrow (represented by the open switch 135) such that the output data 132 is not provided to downstream processes (e.g., processes implemented in a downstream computing system—not shown) until the entire first pulse 112A has been successfully processed. In some examples, the stream of output data is associated with a unique identifier linking the output data to its associated input data pulse.

As the processing of the first pulse 112A of the input data stream 112 progresses, the state of the persistent data, the state of the streaming inputs, and the state of the streaming outputs changes. In some examples, the computing system 100 performs a checkpoint procedure in which these state changes are recorded (sometimes asynchronously) in a volatile temporary journal 141 as they occur. The temporary journal 141 asynchronously writes the recorded state changes to a durable journal 142. In some examples, state changes stored in the temporary journal 141 and the durable journal 142 are also associated with the unique identifier such that the stream of output data and the journaled state changes are both linked to their associated input data pulse. In some examples, the unique identifier is referred to as "checkpoint identifier."

Referring to FIG. 7C, upon ingestion of the entire first pulse 112A, the computing system 100 encounters a pulse-ending indicator which signals the computing system 100 to perform a checkpoint procedure. In the checkpoint procedure, the computing system stops ingesting data and to allows the computing nodes 121 to quiesce (i.e., to finish processing any unprocessed records of the first pulse 112A present in the computing system 100). During this time, the temporary journal 141 continues asynchronously writing the recorded state changes to the durable journal 142. Eventually, once the computing nodes 121 quiesce, the computing system 100 completes recording state changes related to the first pulse 112A to the temporary journal 141.

By allowing the computing system to quiesce, it is ensured that when the system completes recording state changes related to the first pulse 112A to the temporary journal 141, no process state, messages, or transients are present in the computing system because the data processing graph isn't running at that time.

Figure 7D:
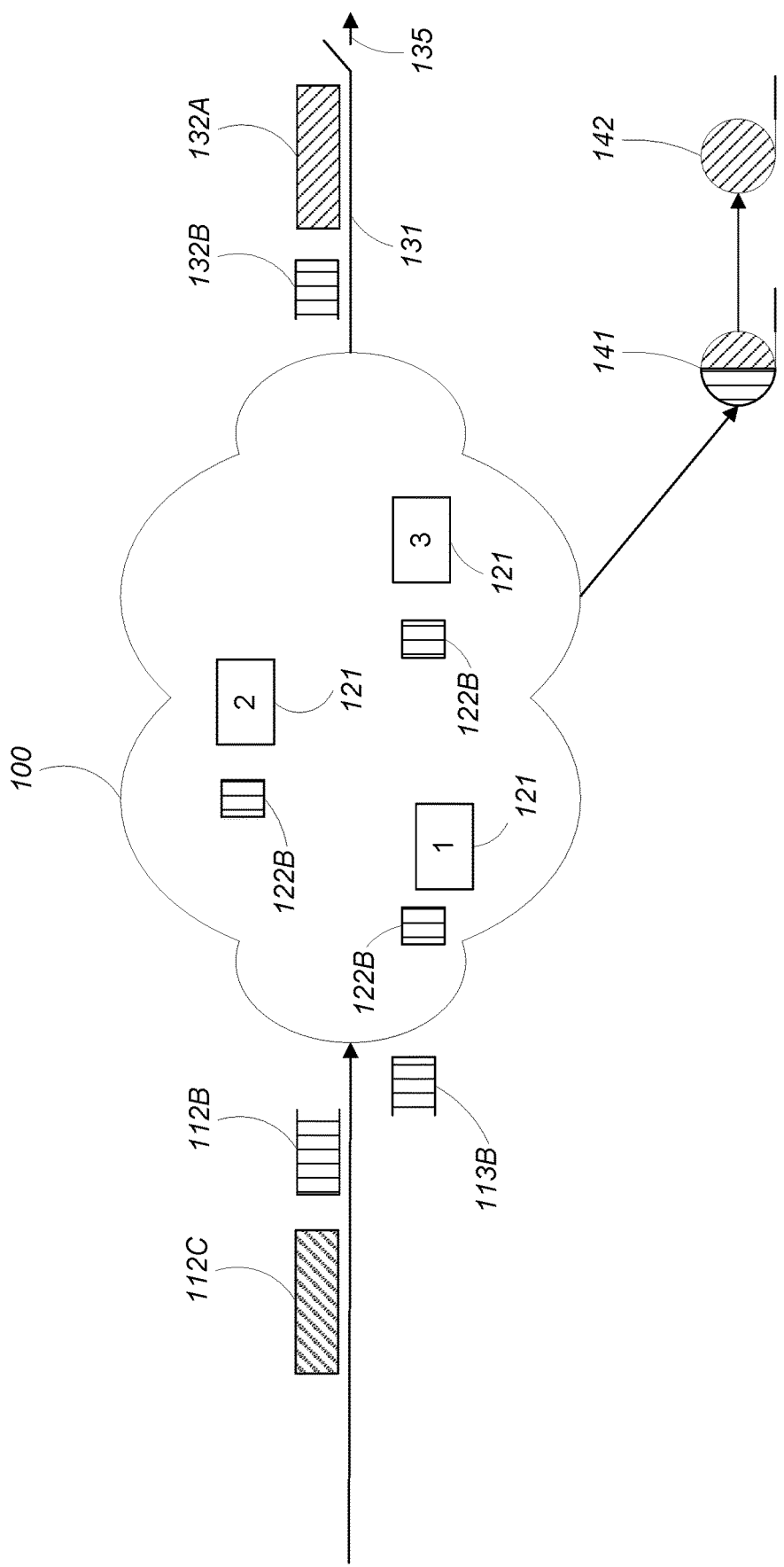
FIG. 7D shows the computing system of FIG. 7A processing a second pulse of input data and journaling state changes related to the processing of the second pulse while durably storing the state changes related to the first pulse of input data.

Referring to FIG. 7D, with the checkpoint for the first pulse 112A recorded in the temporary journal 141, the computing system 100 begins processing the second pulse of data 112B. To do so, the computing system 100 ingests data from the second pulse 112B of the data stream and provides the ingested data to the computing nodes 121 for processing according to the one or more data processing graphs. A copy of the ingested data 113B from the second pulse 112B is also stored in persistent data for later retrieval if a recovery operation is required.

As the processing of the second pulse 112B of the data stream progresses the state of the persistent data, the state of the streaming inputs, and the state of the streaming outputs changes. A checkpoint procedure for the second pulse 112B is performed in which the state changes are recorded in the temporary journal 141 as they occur. At the time shown in FIG. 7D, the temporary journal 141 has not completed asynchronously writing the recorded state changes for the first pulse 112A to the durable journal 142, so the temporary journal 141 includes recorded state changes for both the first pulse 112A and the second pulse 112B (each identified by their respective unique checkpoint identifier). In some examples, by allowing journal entries associated with a second pulse of input data to be written before journal entries associated with a first, previous pulse of input data is made durable, the computing system is able to shrink the pulse interval to less than one disk rotation (around 10 ms) because the checkpoints, and therefore the pulses, can repeat before the checkpoint records have been made durable (which could require waiting on the order of a full disk rotation).

The first stream of output data 132A remains in an escrowed state for as long as the temporary journal 141 has not completed asynchronously writing the recorded state changes for the first pulse 112A.

A second stream of output data 132B generated by the computing nodes 121 is provided to the output flow 131 and is also held in escrow (behind the first stream of output data 132A) such that the second stream of output data 132B is not provided to downstream processes until the second first pulse 112B has been successfully processed.

Referring to FIG. 7E, when the temporary journal 141 completes writing the recorded state changes (i.e., the checkpoint is committed) for the first pulse 112A to the durable journal 142, the switch 135 is closed and the first stream of output data 132A is released to downstream processes. The recorded state changes for the first pulse 112A stored in the durable journal 142 represent the state of the computing system 100 at completion of processing the first pulse 112A, and are collectively referred to as a first checkpoint. With the first checkpoint written to durable storage, the state changes associated with the first pulse 112A are no longer present in the temporary journal 141.

Figure 7F:
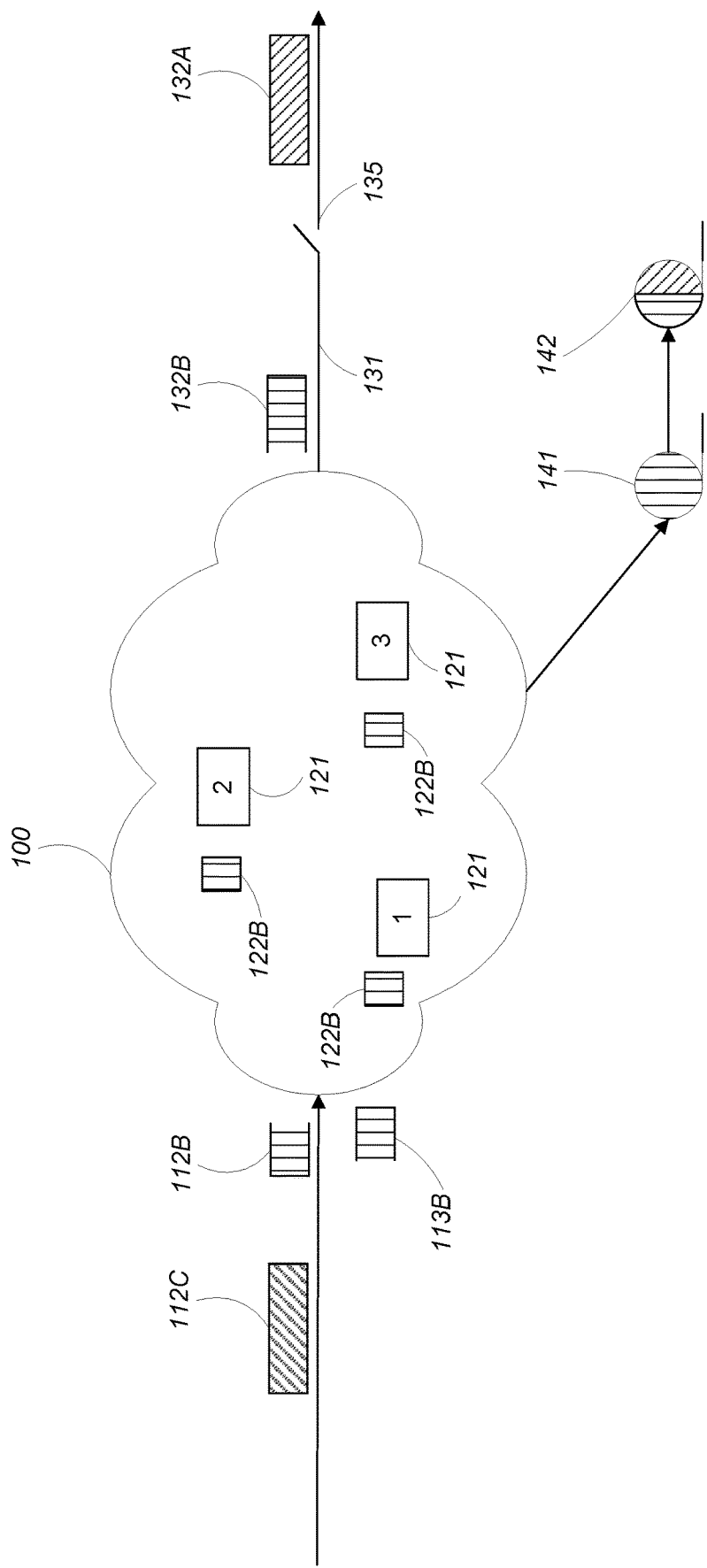
FIG. 7F shows the computing system of FIG. 7A continuing to maintain output data generated from the second pulse of input data in escrow and journaling state changes related to the second pulse of input data.

Referring to FIG. 7F the switch 135 is reopened such that the second stream of output data 132B remains in escrow. The computing system 100 continues to ingest and process the second pulse of data 112B to add to the second stream of output data 132B. With the first checkpoint written to the durable journal 142, the temporary journal 141 begins asynchronously writing a second checkpoint including the recorded state changes for the second pulse 112B to the durable journal 142.

Figure 7G:
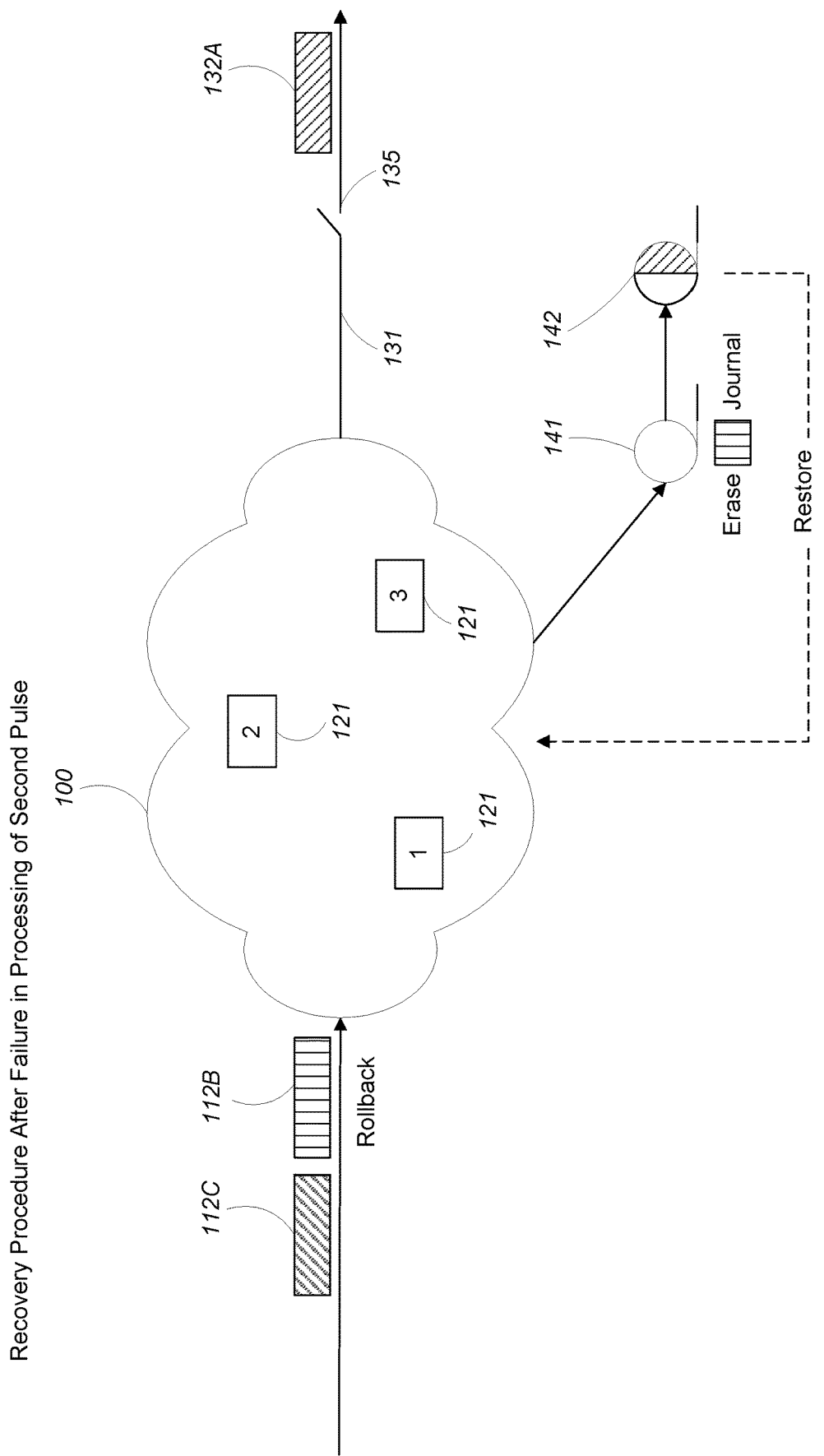
FIG. 7G shows the computing system of FIG. 7A recovering from an error in processing the second pulse of input data.

Referring to FIG. 7G, at some point during the processing of the second pulse 112B, an error occurs and a recovery procedure is performed. In general, the error recovery procedure restores the state of the computing system to its state at the first checkpoint (i.e., its state at completion of processing of the first pulse 112A.) For example, in the recovery procedure, the state of the persistent data, the state of the streaming inputs, and the state of the streaming outputs is restored. This includes clearing the second stream of output data 132B and combining the copy of the ingested data 113B for the second pulse 112B with the unprocessed portion of the second pulse 112B to reconstruct the original second pulse 112B. The state information in the durable journal 142 is used to restore the state of the computing system 100 (i.e., the state of the persistent data, the state of the streaming inputs, and the state of the streaming outputs) to the state represented by the first checkpoint.

Upon completion of the recovery procedure, the computing system 100 commences processing the second pulse 112B as if no error had ever occurred.

4.5 Distributed Journal

Figure 8:
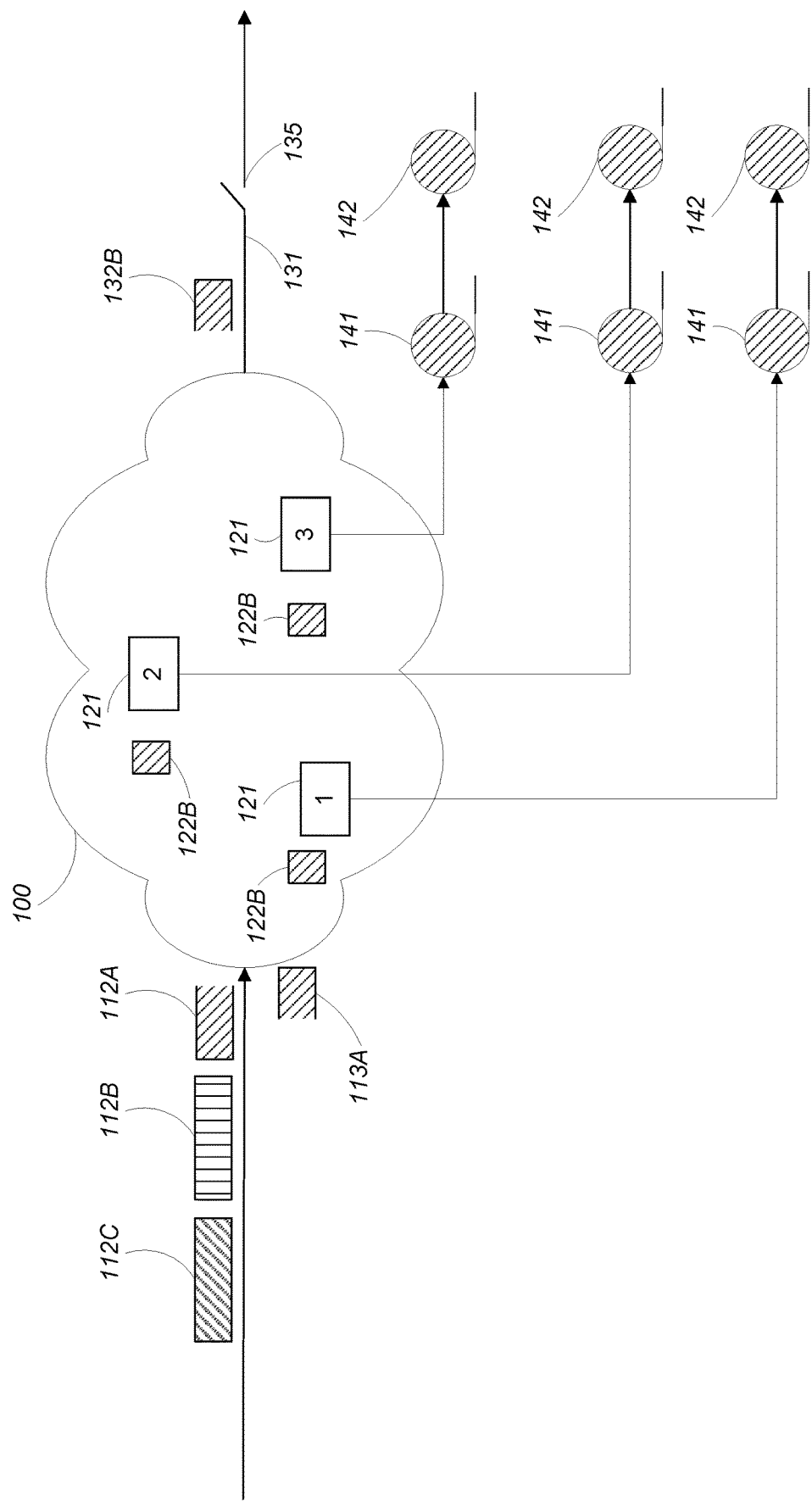
FIG. 8 is a computing system implementing a distributed incremental and pipelined pulsed ingestion checkpointing approach.

In the computing system described above, checkpoint records including state changes are durably to a single global journal. In some examples, using a single global journal can limit system scalability. Referring to FIG. 8, in a more scalable approach the computing system 100 uses a distributed journal to store checkpoints. For example, each of the computing nodes 121 maintains its own individual temporary journal 141 and durable journal 142.

In some examples, the individual journals maintained by the computing nodes 121 are referred to as journal fragments, with each journal fragment corresponding to different fragment of persistent data. For example, each computing node 121 in the computing system 100 is associated with a journal fragment covering the data associated with the computing node 121. Whenever the computing system 100 changes a data item, it writes a journal entry to the journal fragment associated with the data item (i.e. to the journal fragment associated with the computing node 121 storing the data item).

4.5.1 Snapshotting

In some examples, one potential problem is that the total size of all journal fragments may grow without bound, consuming unbounded amounts of storage. Furthermore, the time to recover from a failure would then also grow without bound because the system would need to replay the journal fragments in their entirety. A solution to this potential problem includes 'snapshotting' the data corresponding to a journal fragment then discarding portions of the journal fragment that were created prior to the start of the snapshot process. In the event of a failure, the computing system can recover by loading a snapshot and then applying the journal to the data from the snapshot In some implementations, snapshots share certain properties with database checkpoints.

In one approach to storing snapshot(s), each snapshot has an associated start time and an associated end time. The state of any particular portion of the persistent data within the snapshot is known to exist at a time between the start and end time. In some examples, the snapshots are distributed as snapshot fragments, with each snapshot fragment being tied to a given journal fragment. In general, the system generates a snapshot fragment for each data fragment repeatedly until the system is shut down. To do so, for each data fragment, the system creates a snapshot fragment and tags it as 'pending'. In some examples, the snapshot fragments are replicated across multiple servers. The computing system then sets the start time of the snapshot fragment as the current value of a unique checkpoint identifier (e.g., a checkpoint counter) for the currently processing checkpoint. With the snapshot in the pending state and associated with a unique checkpoint identifier, the snapshot is considered to be 'started.'

The persistent data associated with the data fragment is then scanned and the current data values (i.e., the data values not yet durably written to the journal since the previous snapshot fragment) are written to the snapshot fragment associated with the data fragment. In some examples, each current data value written to the snapshot is associated with a timestamp at which the current data value was valid. The system waits for the snapshot fragment to become durable and then for the current journal fragment to commit, guaranteeing that the snapshot fragment includes only committed data. The snapshot fragment then has its end time set to the current value of the unique checkpoint identifier, which is considered to be the 'end' of the snapshot fragment. The snapshot fragment is marked as final and any previous snapshot fragments are cleared. In some examples, the journal is forward-truncated to ensure that all journal entries associated with unique checkpoint identifiers prior to the start of the snapshot fragment are ignored, resulting in a reclamation of storage space.

Upon a failure in the computing system 100, the system can restore the durable storage associated with a journal fragment to any committed checkpoint greater than or equal to the 'end' of the snapshot. In some examples, the system 100 does so by first loading the contents of the snapshot fragment into the durable storage. The system 100 then examines the data items and their associated timestamps in the snapshot fragment to identified entries in the journal fragment corresponding to the versions of the data items that were valid at the timestamps. The system 100 then restores the durable storage to the committed checkpoint by rolling the values of the data items from snapshot fragment forward by redoing any updates from the journal fragment not already reflected in the snapshot fragment, until the desired checkpoint marker is found (where the rolling forward starts from the identified entries in the journal fragment). If the durable storage associated with a journal fragment survives a failure, the system can roll it back to any desired checkpoint greater than or equal to the 'end' of the snapshot by scanning the journal fragment in reverse order, starting at values in the snapshot fragment, and undoing all changes until the durable storage is at the state associated with the desired checkpoint is encountered.

In some examples, journal fragments are formed as a distinct file for each checkpoint. The system is able to forward truncate the journal by removing files pertaining to older checkpoints. In some examples, the computing system 100 packages multiple checkpoints in a single file. Each file therefore includes a range of checkpoints. When the system forward truncates the journal, it deletes files with a highest checkpoint prior to the truncation point. At recovery time the system ignores all journal entries before the truncation point. This process can be expedited by recording, in an auxiliary file, the file-offset of each checkpoint record in a given file.

Given the above journal structure, the computing system can recover the most recently committed checkpoint by first halting all processing in the computing system. For each failed computing node, a new computing node is started (possibly on a different physical node). At least one replica of the journal fragment(s) and snapshot fragment(s) associated with the computing node is located and used to restore to the committed checkpoint (as is described above). All surviving computing nodes have their persistent data rolled back to the committed checkpoint and escrowed data is cleared. The input data to the computing system is rolled back to the previous pulse ending indicator and processing is resumed.

Based on the above recovery procedure, before the system resumes processing, it has restored all persistent data to its state as of the most recently committed unit of work, then restarted processing with the subsequent unit of work.

Various other examples of recoverable processing techniques can be used in combination with the techniques described herein, including techniques described in U.S. Pat. Nos. 6,584,581 and 9,354,981, each of which is incorporated herein by reference.

4.6 Replication

The approaches described above provide recoverability but do not necessarily provide high availability or fault tolerance. For example, after a failure, the system needs to reload the persistent data associated with any failed servers from a snapshot then re-apply all changes up to the desired checkpoint, a process which may take hours, during which the system is be unavailable.

In some examples, high availability and fault tolerance is achieved by replicating persistent data (e.g., using database sharding or partitioning techniques) that such that a failure is unlikely to destroy all replicas. For example, each piece of data may be replicated on a different physical node so that a single crash cannot destroy all replicas. Doing so results in higher degrees of resilience by ensuring that, for example, replicas are on nodes with different power supplies or even in different data centers. In some situations, replication approaches also obviate the need for durably storing checkpoint and snapshot data.

In one approach, each data item (e.g., row in a transactional data store table, shared data instance) of the persistent data is replicated such that there exists a master replica of the data item and one or more backup replicas of the data item. To implement this approach, a checkpoint counter is first initialized to 0. All graphs operating in the computing system are then started. Each time a data item in persistent data is changed a replication message, tagged with the checkpoint counter, is asynchronously transmitted, to its replica(s). All output data generated by the computing system is kept in escrow, tagged with the checkpoint counter, and not made immediately visible.

Eventually, a pulse-ending indicator is received for all the streaming inputs, causing a clean shutdown of all of the graphs running in the computing system. Once all of the graphs have exited the checkpoint counter is incremented. All of the graphs in the computing system are then restarted.

Once all replication messages for given checkpoint have been received, the checkpoint is committed the output data tagged with that checkpoint counter value is released from escrow. Thus, in this scheme, replication exactly completely replaces journaling.

To recover from a failure when using the above-described replication scheme, all processing is first halted. For any master replicas that were lost in a failure of a computing node, choose one of the backup replicas to act as the master replica. Then, for each replica, the state of the replica is recovered to its last committed checkpoint. Any escrowed output data is cleared and all input data is restored to the point where the last pulse ending indicator was inserted. Processing is then resumed using the methods described above.

In some examples, the master replica is chosen by first including a primary key in every data item which can be hashed to yield a list of servers such that at least one server in the set is likely to be survive a failure. The first server in the list that is chosen as the master replica. All others are slaves. If a computing node fails, the system marks it as no-longer operational. If a computing has been restored, the system marks it as operational once more.

In some examples, a key requirement of the replication techniques described herein is to be able to roll replicas back to a committed checkpoint when a failure occurs and a recovery operation is necessary. One replication technique that satisfies this requirement operates according to the following algorithm. When the system changes a data item, it transmits a replication message for the new value for the data item. When a computing node receives a replication message, it queues it and applies it asynchronously to the target replica. In some examples, when the system applies a replication message to a data item, it creates a rollback entry which allows it to undo the change. The rollback entry is used for rollback processing after a failure. In some examples, rollback entries are tagged with an associated unique checkpoint identifier. Alternatively, the system keeps multiple versions of the data item in memory.

After a failure, each surviving server performs the following procedure to recover to the checkpoint state. First all unprocessed replication messages that are not tagged with a unique checkpoint identifier subsequent to the recovery point are processed. Then, all rollback entries that are tagged with a checkpoint generation subsequent to the recover point are applied in reverse-order of receipt. After applying all rollback entries, all data is in a state corresponding to the desired recovery point. Note that the amount of work is proportional to the amount of data changed during any generations that need to be rolled back so that if the system has sub-second ingestion pulses then it is entirely plausible that the system can achieve sub-second recovery.

Eventually the failed server is restored to service (or a replacement is brought online). The replication system then replicates data back on to the failed server and, possibly, restores the 'master' status of some or all data on that server.

4.7 Combined Replication and Journaling

In some approaches, both replication and journaling are employed in the computing system. For example, replication is used to achieve high availability and fault tolerance, but it suffers from a catastrophic failure mode in which the simultaneous failure of a too many servers (e.g., all of them due to loss of power or cooling to an entire data center) will permanently lose data with no possibility of recovery. Journaling is used in addition to replication to guard against such failures by storing recovery information on highly durable storage such as disk drives. In this approach, the use of journals is a form of disaster recovery, which is likely to entail considerable downtime.

In one example, combined replication and journaling is performed in a journal then replicate procedure. For example, the computing system journals changes to data items at the point where they take place (i.e. at the master replica), then replicates the journal across multiple devices. This type of approach is usable with HDFS (Hadoop File System) which is configured for replicating everything written to files. In some examples, a downside of this approach is that every data item update results in two waves of network traffic: one to replicate the data, and one to replicate the journal. In another example, combined journaling and replication is performed in a replicate then journal procedure. For example, on a more conventional file system, the computing system could journal changes at the point where they take place AND remotely at the points of replication. This only involves one wave of network traffic as the system replicates the data because the journal is co-located with the replica. The two combined journaling and replication examples described above are essentially equivalent except for the difference in network traffic.

Due to the latency involved in writing to disk, the computing system ends up with two levels of durability for a given checkpoint: replication-level durability and journal-level durability. Replication-level durability does not guarantee against catastrophic multi-node failures. The distinction could impact the point at which the system releases data from escrow. If the system releases outgoing data from escrow when at the point where the system has replication level durability, then the system reduces latencies and can increase the frequency of pulses. The downside of doing so is that, after a catastrophic failure, other applications may have 'seen' data that will get rolled back. Given the (hopeful) rarity of catastrophic failures this may be a reasonable tradeoff. However, the conservative choice is to wait for journal-level durability.

4.8 Interaction with Transactional Data Store

Figure 9A:
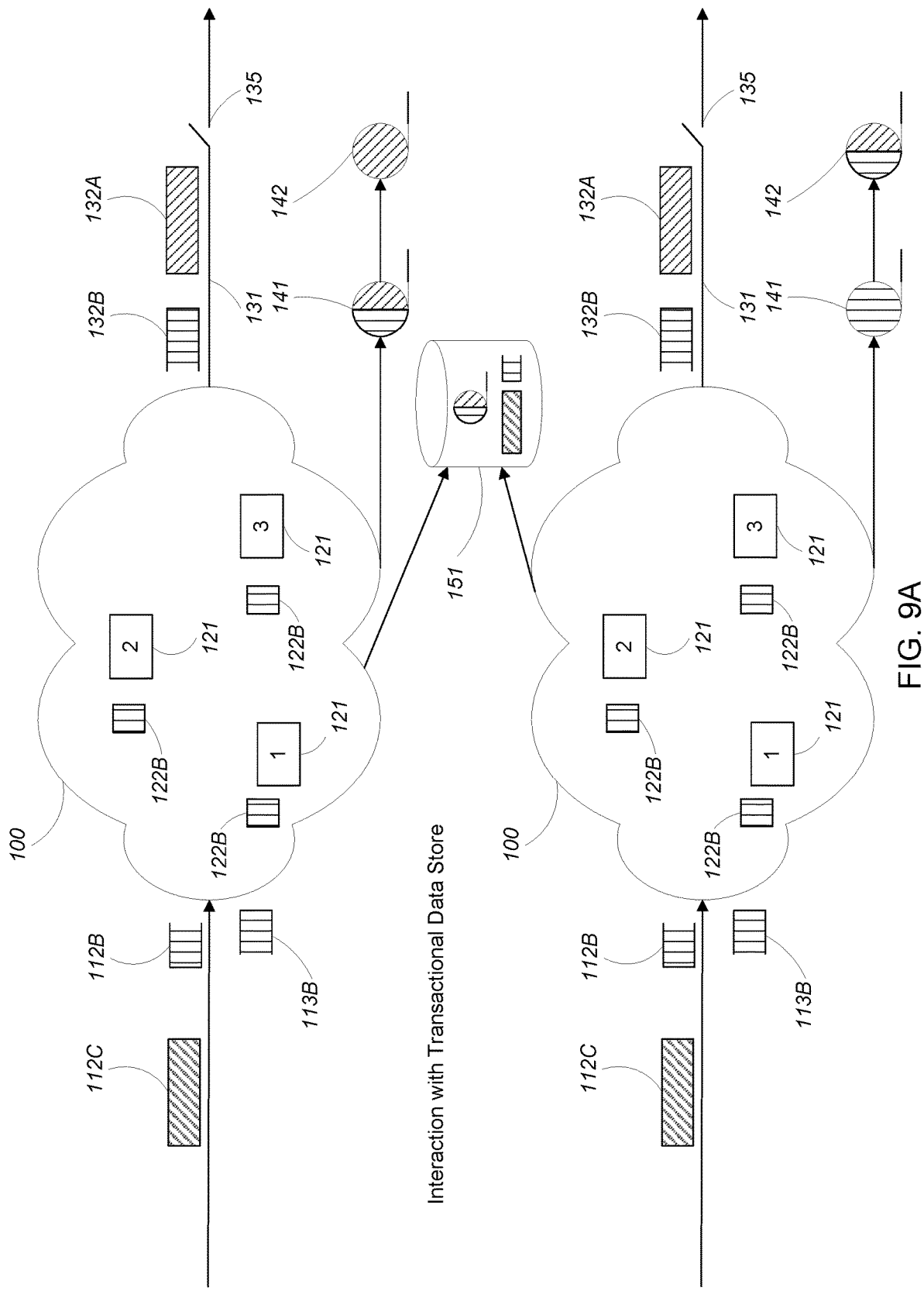
FIG. 9A shows multiple computing systems interacting with a transactional data store and implementing an incremental and pipelined pulsed ingestion checkpointing approach.

Referring to FIG. 9A, in some examples two or more computing systems 100 both employ the journaling techniques described above and interact with a transactional data store 151. The transactional data store 151 independently guarantees the ACID (atomicity, consistency, isolation, and durability) properties of transactions. In some examples, this property of the transactional data store 151 has the potential to subvert the checkpoint mechanism because it might make a transactional data store transaction durable even if the checkpoint it was part of was rolled back due to a failure.

To address this issue, the commit protocol of the transactional data store 151 is modified to separate the "ACI" from the "D." That is, when a transactional data store transaction commits it guarantees atomicity, consistency, and isolation, but not durability. In the modified commit protocol, durability occurs when the checkpoint commits and becomes durable. In some computing systems, this separation is forbidden but in the computing systems described herein it is allowed since, if the checkpoint fails to commit then all evidence of the transactional data store commit is obliterated during the rollback. In particular, any responses in which it participated will have been held in escrow and discarded during the rollback.

Figure 9B:
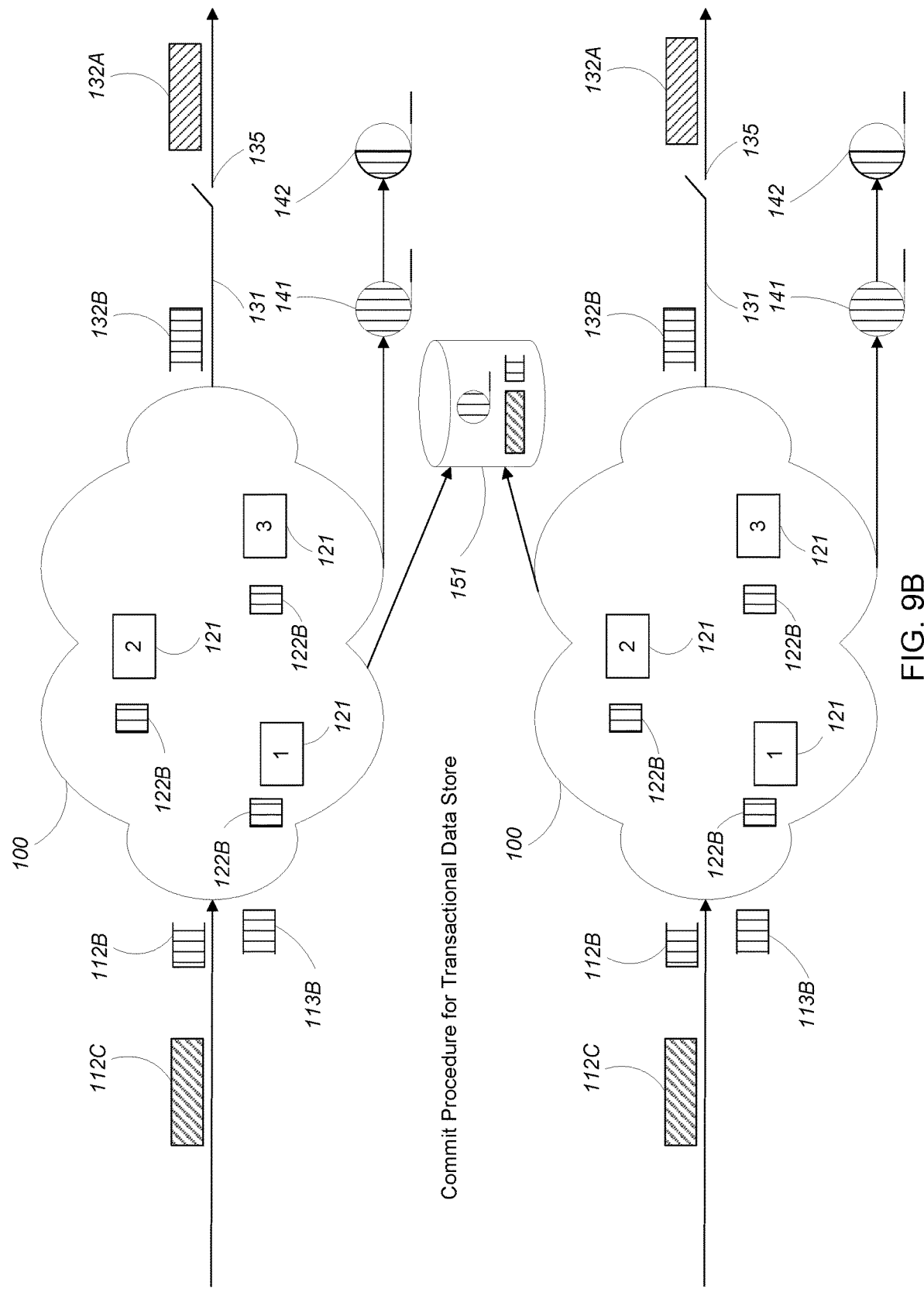
FIG. 9B shows a transactional data store commit procedure for the system of FIG. 9A.

In FIG. 9A, transactional data store transactions related to the first data pulse 112A are not yet committed to the transactional data store 151 and the streams of output data 132A generated from the first data pulses 112A are held in escrow since the checkpoints related to the first data pulses 112A is not yet durable. Referring to FIG. 9B, once the checkpoints related to the first data pulses 112A are made durable, the transactional data store transactions related to the first data pulses 112A are committed to the transactional data store 151 and the streams of output data 132A are released from escrow.

4.9 Checkpoint Triggering

In the examples described above, triggering of checkpoints is time based (e.g., checkpoints are periodically triggered). However, triggering of checkpoints need not be time-based. In some examples, checkpoints are triggered based on resource constraints. For example, a queuing system may allow only a limited number of records to be received before the received messages are committed. In this case, therefore, the system must trigger a checkpoint when this limit is reached or closely approached, regardless of any pulse interval that may have been specified.

4.10 Interaction with Non-Checkpointed Applications and Data

Not all applications can or should operate under the checkpoint algorithms described above. For example, some applications operate on too coarse a time granularity (e.g., a batch graph that runs for several hours). Other applications may operate on too fine a time granularity (e.g., a service with a required response time that is shorter than the checkpoint interval). In some examples, approaches described herein use the concept of a "checkpoint group" to interact with non-checkpointed applications and data.

4.10.1 Checkpoint Groups

Very generally, a checkpoint group is a set of persistent data and associated graphs that are checkpointed on the same pulse schedule. The system may contain multiple checkpoint groups if different applications have different time/throughput tradeoffs. For example, the system might have one checkpoint group with a large volume of incoming data (e.g., 100 million records per second, processed by 100 cores in a server cluster) that requires relatively large (e.g., a 100 millisecond) checkpoint interval for efficiency sake, and another checkpoint group with a lower volume of incoming data with a 10 millisecond checkpoint, chosen to optimize response times. A checkpoint interval that approaches 1 second may not provide a short enough response latency for some applications.

In some examples, a checkpoint group can be configured using a declaration component in a data processing graph. This component can be included in all graphs that need to participate in the group. In addition, it is referenced in the declarations of any shared data or transactional data store tables that need to be managed within the group. A given data set may be 'owned' by at most a single checkpoint group because that is what determines its checkpoint interval. In some examples, the checkpoint group declaration includes additional information, such as a desired replication scheme, data directories where checkpoints and journals may be kept, pulse frequencies, etc.

Not all data and not all graphs reside within a checkpoint group. For example, a transactional data store table may be used primarily by transactional services rather than streaming ingestion graphs. Data stored in 3rd party persistent stores such as Cassandra and Oracle will necessarily be outside the checkpoint group.

4.10.2 Inside and Outside Access

In this context there are two classes of tasks (inside and outside) and two classes of data (inside and outside), where 'inside' means managed by a checkpoint group and 'outside' means not managed by a checkpoint group. If there are multiple checkpoint groups, then each of them will consider the other 'outside'. All access between the inside and the outside is considered 'foreign'. In general, there are four cases of foreign access: an inside task reads outside data an inside task writes outside data, an outside task reads inside data, and an outside task writes inside data. Each of these has associated issues pertaining to correctness.

4.10.2.1 Inside Task Reads Outside Data

A task inside the checkpoint group may read data outside the checkpoint group without any impact on correctness. For example, consider a situation where an inside task reads data from Cassandra, there is a failure and the checkpoint gets rolled back, the task is restarted, the task reads data from Cassandra after the restart and gets a different answer.

At first glance it may appear that the system suffers from inconsistency because it got a different answer on the second read. But there is no inconsistency because all evidence of the first read was obliterated by the rollback. It is exactly as if the application had gone to sleep for a while then woken up and gotten the 'second' answer from Cassandra. So the system does meet the definition of recoverability.

4.10.2.2 Inside Task Writes Outside Data

If a task inside the checkpoint group writes data outside it then the system may well violate recoverability, in one of two ways. First, the write may become durable but the task that made the update gets rolled back. This can result in duplicate updates, which are therefore incorrect. This can only be handled by careful application design. Second, the write might be lost if the writer doesn't (or can't) wait for the update to be durable. So, for example, an inside task might update Casandra then get rolled back, and the Casandra update might become durable. Careful application design would be required to avoid such an eventuality.

4.10.2.3 Outside Task Reads Inside Data

If a task outside a checkpoint group reads data on the inside, then the system risks doing a 'dirty read' of data which might be rolled back after a failure. The following are examples of two ways to resolve this problem. First, the system can optimistically perform a dirty read. For example, ad-hoc queries are run against in-memory data it is extremely doubtful that the effects of a dirty read would have any detectable result. In addition, dirty reads inside a checkpoint group are considerably safer than against a database since database transactions get rolled back in the normal course of processing, whereas checkpoint group rollbacks occur only after a major failure and do not occur in the normal course of processing. This means that it will be extremely rare for dirty reads to have any effect whatsoever.

Second, the system can push the read into the checkpoint group. In this mode, the system transmits an SV apply or a transactional data store transaction to a service running inside the checkpoint group and the answer is held in escrow until the next checkpoint. This operation will incur latency but convert a dirty read into a clean one. This operation can also be handled entirely in the server software so that they user would never be aware of the read-push.

Note that the second approach cannot be used to allow one checkpoint group to access data in another checkpoint group because the reader's checkpoint group cannot checkpoint until the data is released from escrow (the system does not do the checkpoint until all tasks have exited). This could potentially lead to deadlock where a task in checkpoint group A is waiting for an answer to a read from checkpoint group B to return, so group A cannot checkpoint. At the same time, a task in checkpoint group B is doing the exact same thing. Neither group can ever become quiescent and neither group can ever checkpoint.

4.10.2.4 Outside Task Writes Inside Data

If a task outside a checkpoint group writes data on the inside, then the system risks losing the write if the checkpoint gets rolled back. Again, have the same tradeoff exists: the system can do it anyway in the hope that the chances of losing the update are small, or the system can push the write into the checkpoint group as described above. The write would then wait for an escrowed answer indicating confirmation of the write operation. The issues are otherwise the same as those described above.

As a note, this does not affect the correctness of applications inside the checkpoint group. The logic is the same as for the inside-reads-outside case: an outside task writes inside data, the system has a failure and does a rollback which rolls back the write by the outside task, the system restarts, and from the inside the system has no way of telling that the outside task ever happened so the system is in a consistent state. The entity on the outside will have a consistency failure, but that's doesn't affect the correctness of the inside tasks.

In summary, foreign access sometimes (but not always) entails the possibility of inconsistency. Inside reading outside is always consistent. Inside writing to the outside exposes the writer to duplicate and/or lost writes. Outside reading the inside results in dirty reads, but this can be cured by pushing the read into the checkpoint group. Outside writing to the inside may result in a lost write, but this can be cured by pushing the write into the checkpoint group.

Dirty reads and lost writes are failure-mode-only faults. The system does not perform a group-level rollback unless it has a server failure, so these faults only manifest after a failure. In normal operation foreign reads/writes are perfectly safe.

The system cannot use the 'read/write pushing' trick between different checkpoint groups because the interaction between the two groups can lead to deadlock. If necessary this could be cured by firing off an asynchronous operation, e.g., queuing up a message but not waiting for the answer. But the system can still read/write data inside a different checkpoint group as long as the system is able to accept (very rare) dirty reads or lost writes.

5 Implementations

The recoverability techniques described herein (including the attached Appendix) can be implemented, for example, using a programmable computing system executing suitable software instructions or it can be implemented in suitable hardware such as a field-programmable gate array (FPGA) or in some hybrid form. For example, in a programmed approach the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of data processing graphs. The modules of the program (e.g., elements of a data processing graph) can be implemented as data structures or other organized data conforming to a data model stored in a data repository.

The software may be stored in non-transitory form, such as being embodied in a volatile or non-volatile storage medium, or any other non-transitory medium, using a physical property of the medium (e.g., surface pits and lands, magnetic domains, or electrical charge) for a period of time (e.g., the time between refresh periods of a dynamic memory device such as a dynamic RAM). In preparation for loading the instructions, the software may be provided on a tangible, non-transitory medium, such as a CD-ROM or other computer-readable medium (e.g., readable by a general or special purpose computing system or device), or may be delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. An apparatus including:
   a computing system including one or more nodes, the computing system configured to execute a plurality of data processing programs that each process at least one stream of data units; and
   at least one data storage system accessible to at least one of the one or more nodes, the data storage system, in use, storing shared data accessible by at least two of the plurality of data processing programs;
   wherein processing at least one stream of data units using at least a first data processing program of the one or more data processing programs includes:
       processing a first stream of data units to generate output for each of a plurality of subsets of contiguous data units within the first stream of data units;
       initiating termination of processing within the first data processing program, between processing a first subset of contiguous data units and processing a second subset of contiguous data units adjacent to the first subset of contiguous data units within the first stream of data units;
       durably storing at least some changes to the shared data caused by processing the first subset of contiguous data units after determining that the termination of processing within the first data processing program has completed;
       resuming processing within the first data processing program after the changes have been durably stored; and
       releasing, from the first data processing program, first output generated for the first subset of contiguous data units after the changes have been durably stored.

2. The apparatus of claim 1, wherein the plurality of data processing programs each process at least one stream of data units with no program state information being maintained over more than two adjacent data units in the stream.

3. The apparatus of claim 1, wherein the data storage system includes a non-volatile storage medium, and durably storing at least some changes to the shared data caused by processing the first subset of contiguous data units includes storing the changes in the non-volatile storage medium.

4. The apparatus of claim 1, wherein the data storage system includes a communication medium coupled to a plurality of the nodes, and durably storing at least some changes to the shared data caused by processing the first subset of contiguous data units includes sending the changes from a first node to at least a second node of the plurality of the nodes over the communication medium.

5. The apparatus of claim 1, wherein the data storage system also stores stream state information associated with one or more streams of data units processed by at least one of the plurality of data processing programs.

6. The apparatus of claim 5, wherein processing at least one stream of data units using at least the first data processing program further includes, after determining that the termination of processing within the first data processing program has completed, durably storing stream state information associated with the first stream of data units.

7. The apparatus of claim 1, wherein releasing, from the first data processing program, the first output generated for the first subset of contiguous data units includes releasing the first output to an external program that is not included in the plurality of data processing programs executing on the computing system.

8. The apparatus of claim 1, wherein durably stored changes to the shared data caused by processing the first subset of contiguous data units are distinguished from durably stored changes to the shared data caused by processing the second subset of contiguous data units.

9. The apparatus of claim 8, wherein at least some changes to the shared data caused by processing the first subset of contiguous data units are durably stored after at least some changes to the shared data caused by processing the second subset of contiguous data units have started, where the first subset of contiguous data units are before the second subset of contiguous data units within the first stream of data units.

10. The apparatus of claim 9, wherein the first output generated for the first subset of contiguous data units is released from the first data processing program after all changes caused by processing the first subset of contiguous data units have been durably stored.

11. The apparatus of claim 1, wherein processing is resumed within the first data processing program after a first portion of changes have been durably stored but before a second portion of changes have been durably stored.

12. The apparatus of claim 1, wherein the first data processing program terminates processing the first stream of data units periodically, and the computing system begins durably storing at least some changes to the shared data caused by processing data units while the first data processing program is terminated.

13. The apparatus of claim 1, wherein initiating termination of processing within the first data processing program includes inserting a stream-ending indicator between the first subset of contiguous data units the second subset of contiguous data units, and the termination of processing within the first data processing program has completed after all processes that perform tasks specified by the first data processing program have exited normally in response to the stream-ending indicator.

14. The apparatus of claim 1, wherein the shared data is accessible by all of the plurality of data processing programs.

15. An apparatus including:
means for executing a plurality of data processing programs that each process at least one stream of data units; and
means for storing shared data accessible by at least two of the plurality of data processing programs;
wherein processing at least one stream of data units using at least a first data processing program of the one or more data processing programs includes:
 processing a first stream of data units to generate output for each of a plurality of subsets of contiguous data units within the first stream of data units;
 initiating termination of processing within the first data processing program, between processing a first subset of contiguous data units and processing a second subset of contiguous data units adjacent to the first subset of contiguous data units within the first stream of data units;
 durably storing at least some changes to the shared data caused by processing the first subset of contiguous data units after determining that the termination of processing within the first data processing program has completed;
 resuming processing within the first data processing program after the changes have been durably stored; and
 releasing, from the first data processing program, first output generated for the first subset of contiguous data units after the changes have been durably stored.

16. A method including:
executing, on a computing system including one or more nodes, a plurality of data processing programs that each process at least one stream of data units; and
storing, on at least one data storage system accessible to at least one of the one or more nodes, shared data accessible by at least two of the plurality of data processing programs;
wherein processing at least one stream of data units using at least a first data processing program of the one or more data processing programs includes:
 processing a first stream of data units to generate output for each of a plurality of subsets of contiguous data units within the first stream of data units;
 initiating termination of processing within the first data processing program, between processing a first subset of contiguous data units and processing a second subset of contiguous data units adjacent to the first subset of contiguous data units within the first stream of data units;
 durably storing at least some changes to the shared data caused by processing the first subset of contiguous data units after determining that the termination of processing within the first data processing program has completed;
 resuming processing within the first data processing program after the changes have been durably stored; and
 releasing, from the first data processing program, first output generated for the first subset of contiguous data units after the changes have been durably stored.

17. Software stored in a non-transitory form on a computer-readable medium, the software including instructions for causing a computing system to:
execute a plurality of data processing programs that each process at least one stream of data units; and
store shared data accessible by at least two of the plurality of data processing programs;
wherein processing at least one stream of data units using at least a first data processing program of the one or more data processing programs includes:
 processing a first stream of data units to generate output for each of a plurality of subsets of contiguous data units within the first stream of data units;
 initiating termination of processing within the first data processing program, between processing a first subset of contiguous data units and processing a second subset of contiguous data units adjacent to the first subset of contiguous data units within the first stream of data units;
 durably storing at least some changes to the shared data caused by processing the first subset of contiguous data units after determining that the termination of processing within the first data processing program has completed;
 resuming processing within the first data processing program after the changes have been durably stored; and
 releasing, from the first data processing program, first output generated for the first subset of contiguous data units after the changes have been durably stored.

18. An apparatus including:
a computing system including one or more nodes, the computing system configured to execute a plurality of data processing programs that each process at least one stream of data units; and
at least one data storage system accessible to at least one of the one or more nodes, the data storage system, in use, storing shared data accessible by at least two of the plurality of data processing programs;
wherein processing two or more streams of data units using at least a first group of multiple data processing programs of the plurality of data processing programs includes:
 processing, for each data processing program in the first group, a respective stream of data units that includes a plurality of subsets of contiguous data units;
 initiating termination of processing within each data processing program in the first group, between processing a first subset of contiguous data units and processing a second subset of contiguous data units adjacent to the first subset of contiguous data units within the respective stream of data units;
 durably storing at least some changes to the shared data caused by processing the first subset of contiguous data units after determining that the termination of processing within each data processing program in the first group has completed; and
 resuming processing within each data processing program in the first group after the changes have been durably stored.

19. The apparatus of claim 17, wherein the plurality of data processing programs each process at least one stream of data units with no program state information being maintained over more than two adjacent data units in the stream.

20. The apparatus of claim 17, wherein the data storage system includes a non-volatile storage medium, and durably storing at least some changes to the shared data caused by processing the first subset of contiguous data units includes storing the changes in the non-volatile storage medium.

21. The apparatus of claim 17, wherein the data storage system includes a communication medium coupled to a plurality of the nodes, and durably storing at least some changes to the shared data caused by processing the first subset of contiguous data units includes sending the changes from a first node to at least a second node of the plurality of the nodes over the communication medium.

22. The apparatus of claim 17, wherein the data storage system also stores stream state information associated with one or more streams of data units processed by at least one of the plurality of data processing programs.

23. The apparatus of claim 22, wherein processing two or more streams of data units using at least the first group of multiple data processing programs further includes, after determining that the termination of processing within each data processing program in the first group has completed, durably storing stream state information associated with each respective stream of data units processed by any of the data processing programs in the first group.

24. The apparatus of claim 17, wherein processing two or more streams of data units using at least the first group of multiple data processing programs further includes releasing, from the first group of multiple data processing programs, first output generated for the first subset of contiguous data units after the changes have been durably stored.

25. The apparatus of claim 24, wherein releasing, from the first group of multiple data processing programs, the first output generated for the first subset of contiguous data units includes releasing the first output to one of the plurality of data processing programs executing on the computing system that is not included in the first group of multiple data processing programs.

26. The apparatus of claim 24, wherein releasing, from the first group of multiple data processing programs, the first output generated for the first subset of contiguous data units includes releasing the first output to an external program that is not included in the plurality of data processing programs executing on the computing system.

27. The apparatus of claim 26, wherein the external program sends a request to access particular shared data that is accessible by at least one data processing program in the first group, and a result of the request is released to the external program after all changes to the particular shared data that occurred before the request was received have been durably stored.

28. The apparatus of claim 24, wherein durably stored changes to the shared data caused by processing the first subset of contiguous data units are distinguished from durably stored changes to the shared data caused by processing the second subset of contiguous data units.

29. The apparatus of claim 28, wherein at least some changes to the shared data caused by processing the first subset of contiguous data units are durably stored after at least some changes to the shared data caused by processing the second subset of contiguous data units have started, where the first subset of contiguous data units are before the second subset of contiguous data units within the first stream of data units.

30. The apparatus of claim 29, wherein the first output generated for the first subset of contiguous data units is released from the first group of multiple data processing programs after all changes caused by processing the first subset of contiguous data units have been durably stored.

31. The apparatus of claim 17, wherein processing two or more streams of data units includes processing four or more streams of data units using at least the first group of multiple data processing programs and a second group of multiple data processing programs of the plurality of data processing programs.

32. The apparatus of claim 31, wherein each group of multiple data processing programs terminates processing of respective streams of data units periodically, and the computing system begins durably storing at least some changes to the shared data caused by processing data units while all data processing programs in that group are terminated.

33. The apparatus of claim 32, wherein the first group of data processing programs terminates and processing of respective streams of data units at a first frequency, and the second group of data processing programs terminate processing of respective streams of data units at a second frequency different from the first frequency.

34. The apparatus of claim 17, wherein processing is resumed within each data processing program in the first group after a first portion of changes have been durably stored but before a second portion of changes have been durably stored.

35. The apparatus of claim 17, wherein the first group of multiple data processing programs terminates processing the two or more streams of data units periodically, and the computing system begins durably storing at least some changes to the shared data caused by processing data units while all data processing programs in the first group are terminated.

36. The apparatus of claim 17, wherein initiating termination of processing within the first data processing program includes inserting a stream-ending indicator between the first subset of contiguous data units the second subset of contiguous data units, and the termination of processing within the first data processing program has completed after all processes that perform tasks specified by the first data processing program have exited normally in response to the stream-ending indicator.

37. The apparatus of claim 17, wherein the shared data is accessible by all of the plurality of data processing programs.

38. An apparatus including:
means for executing a plurality of data processing programs that each process at least one stream of data units; and
means for storing shared data accessible by at least two of the plurality of data processing programs;
wherein processing two or more streams of data units using at least a first group of multiple data processing programs of the plurality of data processing programs includes:
processing, for each data processing program in the first group, a respective stream of data units that includes a plurality of subsets of contiguous data units;
initiating termination of processing within each data processing program in the first group, between processing a first subset of contiguous data units and processing a second subset of contiguous data units adjacent to the first subset of contiguous data units within the respective stream of data units;
durably storing at least some changes to the shared data caused by processing the first subset of contiguous data units after determining that the termination of processing within each data processing program in the first group has completed; and resuming processing within each data processing program in the first group after the changes have been durably stored.

39. A method including:

executing, on a computing system including one or more nodes, a plurality of data processing programs that each process at least one stream of data units; and storing, on at least one data storage system accessible to at least one of the one or more nodes, shared data accessible by at least two of the plurality of data processing programs;

wherein processing two or more streams of data units using at least a first group of multiple data processing programs of the plurality of data processing programs includes:

processing, for each data processing program in the first group, a respective stream of data units that includes a plurality of subsets of contiguous data units;

initiating termination of processing within each data processing program in the first group, between processing a first subset of contiguous data units and processing a second subset of contiguous data units adjacent to the first subset of contiguous data units within the respective stream of data units;

durably storing at least some changes to the shared data caused by processing the first subset of contiguous data units after determining that the termination of processing within each data processing program in the first group has completed; and resuming processing within each data processing program in the first group after the changes have been durably stored.

40. Software stored in a non-transitory form on a computer-readable medium, the software including instructions for causing a computing system to:

execute a plurality of data processing programs that each process at least one stream of data units; and store shared data accessible by at least two of the plurality of data processing programs;

wherein processing two or more streams of data units using at least a first group of multiple data processing programs of the plurality of data processing programs includes:

processing, for each data processing program in the first group, a respective stream of data units that includes a plurality of subsets of contiguous data units;

initiating termination of processing within each data processing program in the first group, between processing a first subset of contiguous data units and processing a second subset of contiguous data units adjacent to the first subset of contiguous data units within the respective stream of data units;

durably storing at least some changes to the shared data caused by processing the first subset of contiguous data units after determining that the termination of processing within each data processing program in the first group has completed; and resuming processing within each data processing program in the first group after the changes have been durably stored.

41. An apparatus including:

a computing system including one or more nodes, the computing system configured to execute a plurality of data processing programs that each process at least one stream of data units; and at least one data storage system accessible to at least one of the one or more nodes, the data storage system, in use, storing shared data accessible by at least two of the plurality of data processing programs;

wherein processing at least one stream of data units using at least a first data processing program of the plurality of data processing programs includes:

processing a first stream of data units that includes a plurality of subsets of contiguous data units;

initiating termination of processing within the first data processing program, between processing a first subset of contiguous data units and processing a second subset of contiguous data units adjacent to the first subset of contiguous data units within the first stream of data units;

durably storing at least some changes to the shared data caused by processing the first subset of contiguous data units after determining that the termination of processing within the first data processing program has completed; and resuming processing within the first data processing program before all of the changes have completed being durably stored.

42. The apparatus of claim 40, wherein the plurality of data processing programs each process at least one stream of data units with no program state information being maintained over more than two adjacent data units in the stream.

43. The apparatus of claim 40, wherein the data storage system includes a non-volatile storage medium, and durably storing at least some changes to the shared data caused by processing the first subset of contiguous data units includes storing the changes in the non-volatile storage medium.

44. The apparatus of claim 40, wherein the data storage system includes a communication medium coupled to a plurality of the nodes, and durably storing at least some changes to the shared data caused by processing the first subset of contiguous data units includes sending the changes from a first node to at least a second node of the plurality of the nodes over the communication medium.

45. The apparatus of claim 40, wherein processing at least one stream of data units using at least the first data processing program further includes storing at least one snapshot of the shared data and storing a journal of changes to the shared data caused by processing data units after the snapshot was stored.

46. The apparatus of claim 45, wherein durably storing at least some changes to the shared data caused by processing the first subset of contiguous data units includes storing at least a portion of the snapshot and storing at least a portion of the journal of changes.

47. The apparatus of claim 40, wherein the data storage system also stores stream state information associated with one or more streams of data units processed by at least one of the plurality of data processing programs.

48. The apparatus of claim 47, wherein processing at least one stream of data units using at least the first data processing program further includes, after determining that the termination of processing within the first data processing program has completed, durably storing stream state information associated with the first stream of data units.

49. The apparatus of claim 40, wherein processing at least one stream of data units using at least the first data processing program further includes, before determining that the termination of processing within the first data processing program has completed, durably storing at least some changes to the shared data caused by processing the first subset of contiguous data units.

50. The apparatus of claim 49, wherein processing at least one stream of data units using at least the first data processing program further includes, after resuming processing within the first data processing program, durably storing at least some changes to the shared data caused by processing the second subset of contiguous data units.

51. The apparatus of claim 40, wherein durably stored changes to the shared data caused by processing the first subset of contiguous data units are distinguished from durably stored changes to the shared data caused by processing the second subset of contiguous data units.

52. The apparatus of claim 51, wherein at least some changes to the shared data caused by processing the first subset of contiguous data units are durably stored after at least some changes to the shared data caused by processing the second subset of contiguous data units have started, where the first subset of contiguous data units are before the second subset of contiguous data units within the first stream of data units.

53. The apparatus of claim 40, wherein processing at least one stream of data units using at least the first data processing program further includes further includes generating output for each of the plurality of subsets of contiguous data units, and releasing from the first data processing program, first output generated for the first subset of contiguous data units after the changes have completed being durably stored.

54. The apparatus of claim 53, wherein the first output generated for the first subset of contiguous data units is released from the first data processing program after all changes caused by processing the first subset of contiguous data units have been durably stored.

55. The apparatus of claim 40, wherein the first data processing program terminates processing the first stream of data units periodically, and the computing system begins durably storing at least some changes to the shared data caused by processing data units while the first data processing program is terminated.

56. The apparatus of claim 40, wherein initiating termination of processing within the first data processing program includes inserting a stream-ending indicator between the first subset of contiguous data units the second subset of contiguous data units, and the termination of processing within the first data processing program has completed after all processes that perform tasks specified by the first data processing program have exited normally in response to the stream-ending indicator.

57. The apparatus of claim 40, wherein the shared data is accessible by all of the plurality of data processing programs.

58. An apparatus including:
means for executing a plurality of data processing programs that each process at least one stream of data units; and
means for storing shared data accessible by at least two of the plurality of data processing programs;
wherein processing at least one stream of data units using at least a first data processing program of the plurality of data processing programs includes:
processing a first stream of data units that includes a plurality of subsets of contiguous data units;
initiating termination of processing within the first data processing program, between processing a first subset of contiguous data units and processing a second subset of contiguous data units adjacent to the first subset of contiguous data units within the first stream of data units;
durably storing at least some changes to the shared data caused by processing the first subset of contiguous data units after determining that the termination of processing within the first data processing program has completed; and
resuming processing within the first data processing program before all of the changes have completed being durably stored.

59. A method including:
executing, on a computing system including one or more nodes, a plurality of data processing programs that each process at least one stream of data units; and
storing, on at least one data storage system accessible to at least one of the one or more nodes, shared data accessible by at least two of the plurality of data processing programs;
wherein processing at least one stream of data units using at least a first data processing program of the plurality of data processing programs includes:
processing a first stream of data units that includes a plurality of subsets of contiguous data units;
initiating termination of processing within the first data processing program, between processing a first subset of contiguous data units and processing a second subset of contiguous data units adjacent to the first subset of contiguous data units within the first stream of data units;
durably storing at least some changes to the shared data caused by processing the first subset of contiguous data units after determining that the termination of processing within the first data processing program has completed; and
resuming processing within the first data processing program before all of the changes have completed being durably stored.

60. Software stored in a non-transitory form on a computer-readable medium, the software including instructions for causing a computing system to:
execute a plurality of data processing programs that each process at least one stream of data units; and
store shared data accessible by at least two of the plurality of data processing programs;
wherein processing at least one stream of data units using at least a first data processing program of the plurality of data processing programs includes:
processing a first stream of data units that includes a plurality of subsets of contiguous data units;
initiating termination of processing within the first data processing program, between processing a first subset of contiguous data units and processing a second subset of contiguous data units adjacent to the first subset of contiguous data units within the first stream of data units;
durably storing at least some changes to the shared data caused by processing the first subset of contiguous data units after determining that the termination of processing within the first data processing program has completed; and
resuming processing within the first data processing program before all of the changes have completed being durably stored.

61. The apparatus of claim 1 wherein processing the at least one stream of data units includes ceasing ingestion of new data units of the at least one stream of data units and continuing to process data units of the first subset of contiguous data units after termination of processing is initiated and until the first subset of contiguous data units are substantially fully processed.

62. The apparatus of claim 61 wherein durably storing the at least some changes to the shared data commences after the first subset of contiguous data units are substantially fully processed.

* * * * *